US012683968B2

(12) United States Patent
Hakim et al.

(10) Patent No.: US 12,683,968 B2
(45) Date of Patent: Jul. 14, 2026

(54) METHOD AND SYSTEM FOR PROTECTION OF CLOUD-BASED INFRASTRUCTURE

(71) Applicant: Capital One Services, LLC, McLean, VA (US)

(72) Inventors: Syed Sameer Hakim, Dublin, CA (US); Ashwini Vasudev, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 293 days.

(21) Appl. No.: 17/748,592

(22) Filed: May 19, 2022

(65) Prior Publication Data

US 2023/0421562 A1 Dec. 28, 2023

(51) Int. Cl.
*H04L 9/40* (2022.01)
*H04L 41/16* (2022.01)

(52) U.S. Cl.
CPC ............ *H04L 63/102* (2013.01); *H04L 41/16* (2013.01); *H04L 63/101* (2013.01); *H04L 63/20* (2013.01)

(58) Field of Classification Search
None
See application file for complete search history.

(56) References Cited

U.S. PATENT DOCUMENTS

| | | | | | |
|---|---|---|---|---|---|
| 10,755,281 | B1 * | 8/2020 | Yip | .................... | G06Q 20/4016 |
| 10,873,601 | B1 * | 12/2020 | Stickle | ................ | H04L 63/1416 |
| 11,496,475 | B2 * | 11/2022 | Harguindeguy | .... | H04L 63/0807 |
| 2017/0134405 | A1 * | 5/2017 | Ahmadzadeh | ........ | G06F 21/554 |
| 2017/0289191 | A1 * | 10/2017 | Thioux | ............... | H04L 63/1441 |
| 2018/0373877 | A1 * | 12/2018 | Bruso | .................... | G06F 21/552 |
| 2019/0081980 | A1 * | 3/2019 | Luo | ......................... | G06N 20/00 |
| 2019/0334943 | A1 * | 10/2019 | Arvanites | ............. | H04W 4/023 |
| 2020/0349639 | A1 * | 11/2020 | Mousseau | .............. | G06Q 10/10 |
| 2021/0067553 | A1 * | 3/2021 | Ries | ...................... | H04L 67/141 |
| 2022/0045990 | A1 | 2/2022 | Subbarayan et al. | | |

FOREIGN PATENT DOCUMENTS

| | | | | | |
|---|---|---|---|---|---|
| CN | 107465702 | B | * 11/2020 | ......... | H04L 63/1408 |
| EP | 3678348 | A1 | 7/2020 | | |
| WO | WO-2009032379 | A1 | * 3/2009 | ............. | G06F 21/55 |

OTHER PUBLICATIONS

Aug. 18, 2023—(WO) International Search Report and Written Opinion—App No. PCT/US2023/022756.

* cited by examiner

*Primary Examiner* — Bassam A Noaman
(74) *Attorney, Agent, or Firm* — Banner & Witcoff, Ltd.

(57) ABSTRACT

Methods, systems, devices, and computer-readable media for a quarantining system are provided. A message comprising an application programming interface (API) request may be sent by a client device to a service provider system for access to a first application. The message may be received at a gateway of the service provider system. The gateway may determine that the API request is associated with potentially harmful, malicious, or otherwise unexpected activity. The message may be routed to a quarantine environment and a decoy API configured to interface with a decoy application that uses decoy information to emulate the requested first application may be identified. The API request may be modified to call the decoy API. The decoy application may be executed and a decoy response generated. The decoy response may be sent to the client device in response to the API request.

20 Claims, 12 Drawing Sheets

METHOD AND SYSTEM FOR PROTECTION OF CLOUD-BASED INFRASTRUCTURE

FIELD OF USE

Aspects of the disclosure relate generally to data security methods. More specifically, aspects of the disclosure relate to managing application programming interface (API) requests to identify and isolate API requests associated with potential harmful or unexpected activity.

BACKGROUND

Federated identity management allows organizations and third parties to establish a trusted relationship between one another for the purpose of sharing identities and authenticating users across their domains. By participating in such a relationship, an organization's users may seamlessly access the resources, such as cloud-based resources, of a third party in a secure and convenient manner. For instance, a user of the organization may login and be authenticated in a domain associated with the organization and then be permitted to access one or more resources in a domain associated with the third party, such as the resources of a software or service provider, without having to perform a separate login and authentication process with the third party for each of the various resources. This process may be referred to as federated single sign-on (SSO). In such trusted relationships, the organization may serve the role of an identity provider (IdP), which authenticates the user and vouches for the user's identity. The third party may serve as a service provider and may thereby provide access to the third party's resources or services. Based on the trust relationship, the service provider may rely on the IdP to verify a user's identity and provide the service provider with notice or proof of such verification. With the increasing complexity and risk associated with managing and securing sensitive data, such as usernames and passwords, service partners are relying on federated identity management solutions to meet their identity management needs. Participating in such relationships may be advantageous for service providers since managing and maintaining user login information in a secure fashion may be a complex task for an organization that is not dedicated to providing such a service or is not well-versed in such technology. Further, service providers may find that using an IdP is quicker, more cost-effective, and more secure than building an identity management solution from scratch; it may reduce a service provider's exposure to risk and liability associated with maintaining such data on their own; and it may provide users with an improved user experience by addressing password fatigue as the users will only need to remember a single password for multiple applications or services, which in turn reduces risk for the organization.

Accordingly, the trusted relationship between the IdP and the service provider may provide a number of advantages for both the IdP and the service provider. However, in some cases, the service provider, instead of relying directly on the IdP to provide verification of a user's identity, may itself outsource this task to its own third party—i.e., a fourth party. That is, the service provider may use a middleman or gatekeeper between it and the IdP to coordinate and manage identity verification received from the IdP. This may be particularly useful when the third party has a relationship with multiple IdPs. Rather than having direct trust relationships between the multiple IdPs, the service provider may have a trust relationship with a fourth party (e.g., a separate authentication platform), which itself has trust relationships with the various IdPs. The IdPs, in this case, may authenticate their respective users and provide proof of such authentication to the fourth party authentication platform, who may then verify the IdPs' proof and may provide its own proof to the service provider, indicating that the IdPs' authentication may be trusted. Accordingly, the service provider may rely on the fourth party authentication platform as a trusted source for vouching for the authentication performed by the IdPs, and the user may be provided access to the service provider's resources or services based on the fourth party authentication platform's proof.

While such an integrated identity management solution may create a safe and secure authentication environment, it may, however, also create more surfaces or areas of exposure that may be targeted and compromised by bad actors. For instance, a user's login credentials may be hacked or stolen and a bad actor pretending to be the user may attempt to access the service provider's resources and data. Alternatively or additionally, a bad actor may hack or compromise an authentication session of a legitimate user at any one of the IdPs or at the fourth party authentication platform. Because the service provider does not itself perform an authentication process, and instead relies on external parties to do so on its behalf, the service provider might not be able to control access to its system at the point of authentication. This may expose the service provider's system and corresponding data to significant risk and potential harmful or unexpected activity from bad actors, compromised users attempting to access the service provider's resources and/or data, software bugs or errors, or the like. A service provider's ability to protect sensitive data while keeping such systems online and available to service non-compromised users is vital for organizations that provide services that are relied on by many users.

Aspects described herein may address these and other problems, and may generally improve the integrity and security of systems and devices maintaining sensitive information.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein relate to systems, apparatus, computer-readable media, and methods for the identification and isolation of API requests associated with potentially harmful or unexpected activity. A client, such as a user, an application, or a device, attempting to access resources of a service provider, such as a cloud-based software as a service (SaaS) hosted by an organization/service provider, may be required to provide proof of authentication and appropriate authorization to the service provider before access to the resource is provided. To accomplish this, the client may use an IdP to perform the authentication. The client may provide their login credentials via IdP, and the IdP, upon successful authentication, may issue a certificate verifying the client's identity. The service provider, however, might not have a trusted relationship with the IdP used by the client, and may instead rely on another authentication platform as a trusted source to authenticate or verify the client's identity. In this case, the authentication platform may be utilized to receive the certificate from the IdP and to verify or confirm the client's identity. Upon its own successful verification of the client's authenticity, the authentication platform may issue one or more tokens to the client vouching for the client's authenticity and indicating what the client is authorized to do and/or access. The authentication platform may send the access token to the client and the client may attach the received token to each subsequent request sent to the service provider as a credential of the user's identity and scope of authorization. When a request, such as an API request to access the requested resource, such as an application, is received from the client by the service provider, the service provider may determine whether the API request is associated with potential harmful or unexpected activity. Determining whether an API request is associated with potential harmful or unexpected activity may be performed based on known or suspected harmful or unexpected activity. As a non-limiting example, the service provider may have received information from a third party or a database notifying or indicating that Client A's login information was included in a database of stolen login credentials. Because the service provider might not perform its own authentication, the service provider may not be able to catch Client A's attempt to log in to its system and deny access at that point. Instead, in such situations, the service provider might not be aware of Client A's presence until a message, such as a message comprising an API request, is received from Client A. At this point, the service provider may determine whether the API request is associated with potential harmful or unexpected activity. If the service provider determines that the API request is associated with potential harmful or unexpected activity, the API request may be blocked from accessing the requested resource and, instead, the API request may be routed to a quarantined area or device, isolated from the requested resource and associated devices, applications, data, etc. Any subsequent API traffic may also be routed to quarantine for a period of time. As a result, the requested resources might not be impacted and may remain available to other clients. The quarantined traffic may be processed by performing one or more quarantine functions. The quarantine functions may perform various actions, such as sending a response back to the client notifying the client that the API request has been blocked, such as by redirecting the client to an error page or a snag page. Additionally or alternatively, the quarantine function may attempt to engage the client further so the client will send additional information that might be used to better assess the threat, while not suspecting that the service provider is aware of the compromised nature of the client's communication. For instance, the quarantine function may request the client provide information related to a second authentication or challenge. Alternatively or additionally, the quarantine function may identify a decoy API that may be configured to emulate the behavior of the originally requested resource using a decoy application and fake or dummy data. A decoy response generated by the quarantine function may be sent to the client. Additionally, information associated with the API request associated with potential harmful or unexpected behavior may be analyzed and may be further used as input for training a machine learning model to better recognize future threats.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
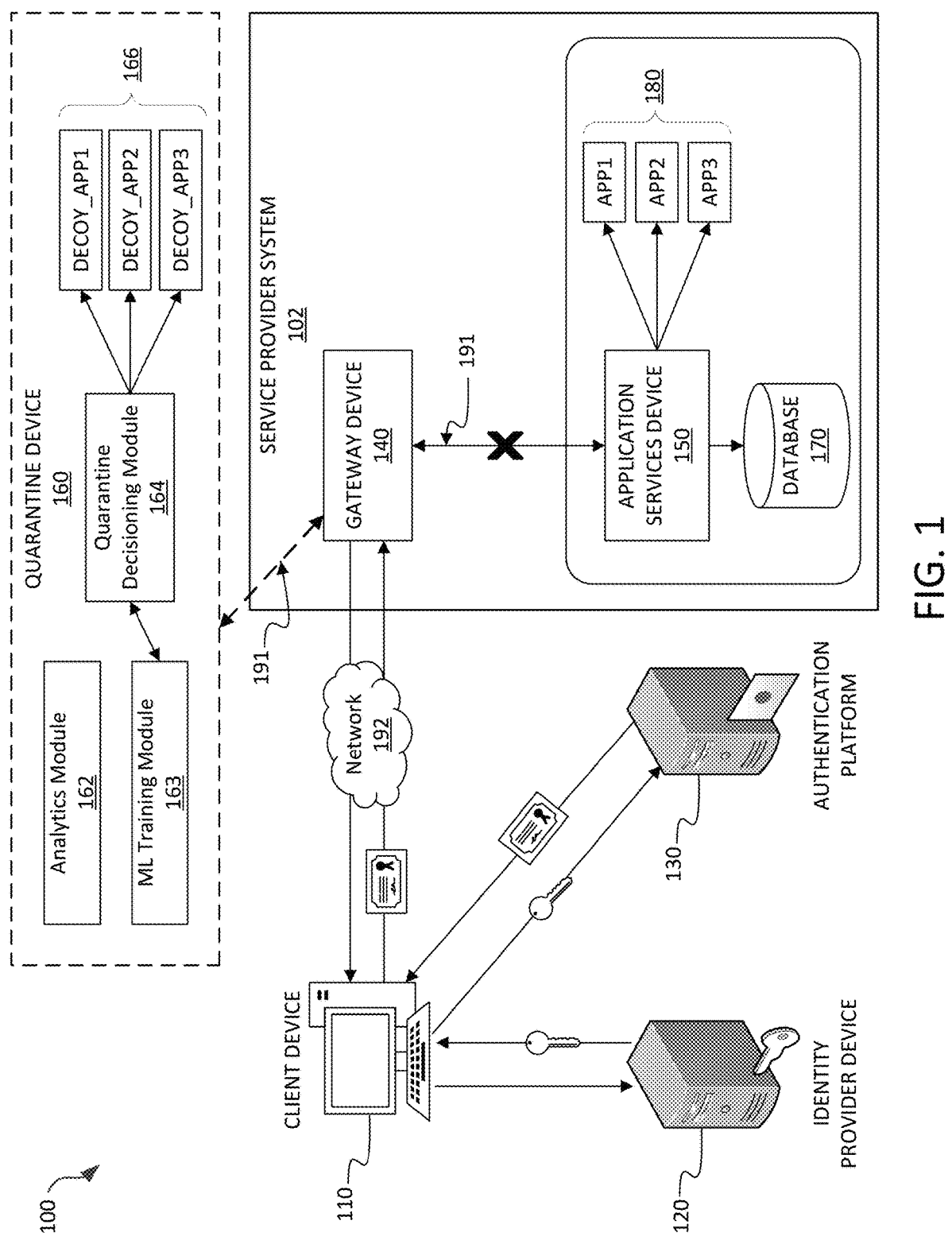
FIG. 1 shows an example computing environment, in accordance with one or more aspects described herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for redirecting API traffic received from a client attempting to access one or more applications hosted by a service provider. The applications may be software as a service (SaaS) applications hosted by the service provider. The API calls may be redirected for quarantine and isolation under certain security and/or business considerations, such as when the client, an account associated with the client, or an associated system is compromised, or is associated with a security threat, vulnerabilities, software bugs, errors, or malicious activity. These security risks might be related to zero-day vulnerabilities, known incidents, internally-detected security compromises of authentication or authorization, or the like. In such cases, authentication and authorization from the compromised clients may be overridden, and traffic from those clients may be quarantined and blocked from accessing requested applications and resources, while traffic from other clients for the same requested applications and resources may continue to be permitted to flow through the service provider's system to access the requested applications and resources. Various methods may be utilized for handling the quarantined traffic. For example, as will be described in further detail herein, the quarantined traffic may be redirected to error pages, snag pages (such as a page providing a message that a snag has been hit or something has gone wrong), to pages emulating authentic responses, or the like. Such responses may be intended to elicit further communication from the client for the purpose of capturing further information without revealing that the compromised posture of the client has been detected by the service provider's system. In addition, the quarantine system may be capable of running analytics on the traffic to gather intelligence about the compromise and train machine learning models to more accurately recognize similar threats in the future.

The system disclosed herein is different from conventional systems or techniques, such as packet filtering firewalls, which may operate at the network level to reject or drop packets based on a comparison of IP addresses, ports, and/or protocols indicated in packet headers with an access control list, or based on such packets not comporting with configured firewall rules. In packet filtering systems, as long as the traffic is transmitted via an authorized IP address and port, the traffic will be allowed to flow through. As a result, in these systems, harmful or compromised communication transmitted via an authorized IP address and port may still flow into an organization's system if, for example, the payload or other portions of the header are compromised by a bad actor. Further, these systems merely permit or deny traffic based on filtering decisions, but do not reroute such traffic and perform any analysis on it. Moreover, these systems do not operate at the API level to isolate API calls received from authenticated and authorized clients, where such calls may be associated with potential harmful or unexpected activity. In the disclosed system, even if packet-level communication might be allowed to be transmitted because such packets are transmitted via an authorized IP address and port, since the system may have knowledge that a source of the data may be compromised or associated with a threat or other potential harmful or unexpected activity, such communication may be captured and thwarted at the API level before it reaches system resources. The disclosed system, as a result, may be able to re-route such communication to an environment where it may be isolated from a production environment so as to protect critical network resources. The disclosed system may further be able to process the potentially harmful communication in a quarantine environment in a manner that emulates legitimacy, such that the sending party is unaware that the system has knowledge of the potentially harmful nature of the communication. In this way, the sending entity, particularly when malicious, may not alter its posture and the system may elicit further communication from the sender so as to better identify the threat and the associated parties.

The disclosed system improves the functioning of computers by providing a mechanism for segmenting compromised API traffic from legitimate, uncompromised API traffic in a manner that prevents the compromised traffic from reaching production applications and resources, while keeping those applications online for access by uncompromised traffic—thereby limiting an impact on the production applications and resources and the uncompromised clients they serve. The disclosed system could not be performed in the human mind or using pen-and-paper at least because the disclosed system is fundamentally rooted in computing technology, and in particular a circumstance involving computer authentication, APIs, and the like.

Referring to FIG. 1, an example computing environment 100 associated with a quarantining system is shown. The computing environment 100 may include one or more systems or computing devices, such as a service provider system 102, a client device 110, an identity provider device 120, an authentication platform 130, a quarantine device 160, and one or more networks, such as a private network 191 and/or a public network 192.

The client device 110 may be a device associated with a client. The client may include an end user, an application, a device, a server, or any other entity that may consume or access resources, such as applications, software, services, data storage, and/or data (it should be noted that the aforementioned list of terms may be used interchangeably throughout the disclosure), provided by the service provider system 102. The client device 110 may send a request for the resources to the service provider system 102. The request from the client device 110 to the service provider system 102 may comprise a call to an application program interface (API), which may be configured to access one or more specified resources. The client device 110 may be configured to communicate with and/or connect, via the public network 192, to one or more computing devices of the computing environment 100. The client device 110 may comprise one or more applications for communicating with the one or more computing devices of the computing environment 100. For instance, the client device 110 may have installed thereon a web browser, which may be used to send requests, such as the API requests, to and process and display data received from the one or more computing devices of the computing environment 100. The client device 110 may be any type of computing device or combination of devices capable of performing the particular functions disclosed herein. For example, the client device 110 may be and/or include a server computer, desktop computer, laptop computer, tablet computer, smart phone, fitness device, or the like, which may include one or more processors, memories, communication interfaces, storage devices, and/or other components. The client device 110, in some instances, may be or include special-purpose computing devices configured to perform the functions disclosed herein.

The service provider system 102 may comprise a server device associated with a service provider. The service provider may provide resources, such as applications, software, data storage, data, and/or services to one or more clients. The one or more clients may send requests, such as API requests, to the service provider system 102 to access the resource provided by the service provider, and if properly authenticated and authorized, the service provider system 102 may permit the client to access the resource. The service provider system 102 may include a gateway device 140, an application services device 150, a database 170, and one or more applications 180.

The application services device 150 may be a device that manages access to one or more resources provided by the service provider, such as APIs and/or the one or more applications 180. For instance, when a valid API request is received at the service provider system 102, the request may be routed, via the gateway device 140, to the application services device 150, and the application services device 150 may route the request to the appropriate APIs and/or associated applications 180.

The database 170 may store information used by one or more of the devices in the computing environment 100. The database 170 may be a comprise one or more of a relational database, a hierarchical database, a distributed database, an in-memory database, a flat file database, an XML database, a NoSQL database, a graph database, cloud object storage (hosted locally or within a public cloud), and/or any other type of database, data warehouse, or device that stores data. All or part of the database 170 may be part of a virtual warehouse as a service system managed and hosted by a third party. For example, a third-party system, such as the SNOWFLAKE data cloud, may provide virtual warehouses as a service, which may operate on behalf of an external organization's computing devices, such as the service provider system 102. The third-party system, in such cases, may store and manage data and may provide query, analytics, and other data tools on behalf of the service provider system 102.

The one or more applications 180 may be any type of application that may be provided by the service provider system 102 and that may operate in the cloud or on a premises associated with the service provider system 102. The one or more applications 180 may include applications provided by the service provider system 102, to one or more clients or subscribers, as software as a service (SaaS) applications. In some cases, the clients/subscribers might not be a human, but may instead may be another application or system requesting access to the one or more applications 180. The one or more applications 180 may include, but need not be limited to, a web browser application, an email application, a project management application, a banking application, a transaction application, a business intelligence application, or any other type of application.

The gateway device 140 may be a device connecting a remote network, such as a public network, to a network, such as a private or host network associated with the service provider system 102. The gateway device 140 may serve as a gatekeeper or a single point of entry to the host network associated with the service provider system 102 and the various devices connected thereto, such as the applications services device 150, the quarantine device 160, the database 170, and the one or more applications 180. All data transmitted to and from the service provider system 102 may be routed through the gateway device 140. The gateway device 140 may be an API gateway, which may guard access to one or more APIs associated with the service provider system 102. The gateway device 140 may be configured to intercept all API requests/traffic being transmitted to the service provider system 102. The gateway device 140 may validate a received API request, such as by validating an access token included in a message comprising the API request. The gateway device 140 may confirm that the requesting application/device is authorized to access the resource requested in the API request. If the validation is successful, the gateway device 140 may route the API request, via the application services device 150, to the appropriate API and/or an associated application 180. The gateway device 140 may receive, from the applications 180 or services, a response to the API request and may transmit the response to the requesting device, such as the client device 110.

The gateway device 140 may, additionally and/or alternatively, make determinations about whether a received API request is associated with potentially malicious, harmful, or otherwise unexpected activity, referred throughout as harmful activity. The gateway device 140 may store information identifying client accounts, devices, IP addresses, domains, requesting applications, etc. that may be associated with potentially harmful activity. The gateway device 140 may store such information in the database 170. The gateway 140 may determine whether the received API request is associated with the stored information, such as whether the API request is made by or received from one of the stored client accounts, devices, IP addresses, domains, requesting applications, etc. The gateway device 140 may, additionally and/or alternatively, receive or retrieve information identifying client accounts, devices, IP addresses, domains, requesting applications, etc. that may be associated with potentially harmful activity. For example, the information might identify that a particular client device is associated with potential harmful activity. The gateway device 140 may determine whether the API request is associated with the received or retrieved information. The gateway device 140 may, additionally and/or alternatively, analyze the API request, or cause the API request to be analyzed, to determine whether the API request is associated with potentially harmful activity. For instance, the gateway 140 may send, to the quarantine device 160, a message received from the client device 110 comprising an API request and the API request may be analyzed by one or more modules of the quarantine device 160 to determine a likelihood or probability that the API request is associated with potentially harmful activity. The quarantine device 160 may return, to the gateway device 140, the determined probability or a confidence score, and the gateway device 140 may, based on the determined probability/confidence score, determine whether the API request is associated with potentially harmful activity. The gateway device 140 may make the determination based on comparing the probability/confidence score to a threshold.

Based on determining that the API request is associated with potentially harmful activity, the gateway device 140 may block the API request from accessing the application services device 150, thereby preventing the API request from being routed to the requested API and/or the associated applications 180. Additionally and/or alternatively, based on the determination about the potentially harmful activity, the gateway device 140 may automatically block any subsequent API traffic received from the client device 110. The block may be for a period of time and/or may be indefinite. The block might not affect API traffic from other clients. However, while the API may be blocked from accessing the requested API and/or associated application 180, the request might not be blocked and may instead be routed to a quarantine environment. That is, the gateway device 140 may route the received message comprising the API request to the quarantine device 160 for further processing. The quarantine device 160 may execute one or more quarantine functions that generate one or more decoy responses to the API request. The quarantine functions may be executed in the place of executing the requested API, in order to protect network resources from being compromised by the potential harmful activity. For instance, in response to an API request deemed to be associated with potential harmful activity, a decoy response may be generated; and the decoy responses may be transmitted, from the quarantine device 160, to the gateway device 140 for ultimate transmission to the requesting device, e.g., the client device 110. The decoy response may emulate a legitimate response to the API request so that the client might not be aware that the service provider system 102 detects the potential harmful activity. In this way, the service provider system 102 may continue to communicate with the client device 110, without the client device 110 changing its posture, and further information may be collected during such communication, so that the potential harmful activity may be further assessed. For example, the decoy response may elicit further communication from the client device 110, such as requesting that the client device 110 provide further information, such as to answer a challenge question, and the gateway device 140 may receive that further subsequent traffic, while also blocking it from accessing the requested APIs, the applications services device 150, the applications 180, and the database 170. The gateway device 140 may additionally route the subsequent traffic to the quarantine device 160 for further processing and analysis, as described above.

The identity provider device 120 may be a device associated with an IdP and may be used to manage, maintain, and authenticate the digital identities of users on behalf of other applications or systems that rely on the IdP. These relying applications and systems may be internal applications and systems or external ones. The identity provider device 120 may be responsible for asserting or confirming the digital identities with Security Assertion Markup Language (SAML) assertions, tokens, certificates or the like for the relying applications or systems to consume. In some cases, the relying application or system may be another authentication system, such as the authentication platform 130, which may receive and verify the IdP's assertion on behalf of another system or device, such as service provider system 102. The client wishing to access the resources provided by the service provider system 102, may first be required to be successfully authenticated before access to the requested resources may be granted. The client may provide login credentials via the IdP, and if successfully authenticated, the IdP may issue a certificate or token and transmit the certificate/token to the client, e.g., the client device 110, as validation or proof of the client's identity. The certificate/token may subsequently be provided by the client device 110, to the service provider system 102 when the client device 110 sends a request to the service provider system 102 or, alternatively, it may be provided, by the client device 110, to the authentication platform 130, which the service provider system 102 may rely on to perform authentication services on its behalf.

The authentication platform 130 may be a trusted system that manages, maintains, and authenticates the digital identities of users on behalf of another unaffiliated system, such as the service provider system 102. Additionally or alternatively, the authentication platform 130 may verify an authentication asserted by another system or device, such as by the identity provider device 120, for the benefit of the service provider system 102. In this case, the authentication platform 130 may serve as a middleman between the server provider system 102 and one or more IdPs, such as the identity provider device 130. The authentication platform 120 may be a platform such as AUTH0, OKTA, FUSION-AUTH, ONELOGIN, HID, PINGIDENTITY, DUO, or other authentication platform.

The quarantine device 160 may be a sandboxed device or environment associated with the service provider's system. The quarantine device 160 may comprise an analytics module 162, a machine learning training module 163, a quarantine decisioning module 164, and/or one or more decoy applications 166. The quarantine device 160 may be a device, logically or physically, separate and isolated from one or more devices associated with the service provider's production environment, such as the service provider system 102. The quarantine device 160 may be used for quarantining and analyzing traffic received at the gateway device 140 from the client device 110. The traffic may be messages comprising API requests transmitted from the client device 110, to the gateway device 140, for access to one or more resources associated with the service provider system 102, such as access to the one or more of the applications 180. Based on a determination, by the gateway device 140, that a received message comprises an API request that is potentially associated with harmful activity, the gateway device 140 may route the message comprising the API request to the quarantine device 160 for processing, while also blocking access to the requested resource, such as the requested API, the applications 180, and associated devices, such as the application services device 150 and the database 170.

In some cases, the gateway device 140 might not have knowledge regarding whether a received API request is associated with potential harmful activity. For instance, the API request may be a well-formed and properly constructed API request, and there might not be an obvious indication that the request is associated with potentially harmful activity. Accordingly, in some cases, the gateway device 140 may, additionally and/or alternatively, send the received message comprising the API request to the quarantine device 160 for a determination, by the quarantine device 160, regarding the likelihood that the API request is associated with potentially harmful activity. The quarantine device 160 may analyze the message and/or the API request using one or more modules, such as the quarantine decisioning module 164, to determine a likelihood or probability that the API request is associated with potentially harmful activity. The quarantine decisioning module 164 may use various algorithms and/or machine learning models trained to determine whether information associated with the message and/or the API request fits with historical patterns of harmful API requests. Such analysis may result in a determination of a probability or a degree of confidence that the API request is associated with potentially harmful activity.

The quarantine device 160 may send to the gateway device 140 the probability/confidence that the API request is associated with potential harmful activity and, based on whether the probability/confidence satisfies a threshold, the gateway device 140 may determine whether the API request should be blocked from accessing the requested resources and, instead, routed to the quarantine device 160 for further processing. The further processing may involve executing a decoy API, instead of executing the requested API. The decoy API may emulate the functionality of the requested API, but instead of interfacing with one of the applications 180 associated with the requested API, the decoy API may interface with a decoy application, such as one of the decoy applications 166. The decoy application 166 may cause one or more quarantine functions to be performed, which may generate a decoy response for transmission to the requesting device, e.g., the client device 110, in response to the API request.

The decoy response may comprise a message notifying the client device 110 or requesting application that the API request has been blocked. Alternatively and/or additionally, the decoy response may comprise a message intended to elicit further communication from the requesting application or the user of the client device 110. Such a decoy response may elicit further communication so that additional information may be collected for assessing the potential threat. Additionally and/or alternatively, the decoy response may elicit further communication so as to prevent malicious entities from determining that they have been identified as a malicious entity. As an example, the decoy response may direct the requesting application at the client device 110 to a page that presents a challenge question or requests further authentication information, such as biometric information (e.g., a fingerprint scan, facial scan, retinal scan, etc.), contact information, such as a phone number or email address for sending a one-time password, or the like. As another example, the decoy response may additionally or alternatively mimic a response from the application associated with the API request, but the response may use dummy or fake data instead of live production data, such that the client may continue to interact with the service provider system 102 without changing his posture because the client might not suspect that the potentially harmful activity has been detected. In such cases, the quarantine function may be a call to a decoy application that mimics the behavior of the requested application, but instead of accessing real production data may instead access dummy or fake data. The quarantine functions may generate different or additional decoy responses for transmission to the client device 110.

The quarantine device 160 may additionally be used for performing analytics on API call traffic sent to the quarantine device 160. As discussed above, the quarantine device 160 may receive API call traffic associated with API requests known to be associated with potential harmful activity and/or API requests where a determination needs to be made as to the probability that the API request is associated with potential harmful activity. When the API request is sent to the quarantine device 160 by the gateway device 140, the quarantine device 160 may store information associated with the API request and/or the message sent from the requesting device, e.g., the client device 110, comprising the API request. The information may be used by the quarantine device 160, such as by the analytic module 162 to develop analytics associated with potential harmful activity or by the machine learning training module 163 to train a machine learning model to recognize potential harmful activity. For instance, the quarantine device 160 may collect information associated with the message comprising the API request. This information may vary based on data included in the message comprising the API request and/or the API request itself. The collected information may include, but need not be limited to, information associated with the client, client application, or client device making the API request, such as a client account identifier, a client account name, a source IP address associated with the client device 110, a geographical location associated with the client device 110 (e.g., city, region, country, longitude, and/or latitude), an identifier associated with the client device 110 (e.g., a media access control (MAC) address), information identifying requesting application, a requesting browser's user agent, etc. The collected information may additionally be related to the client's authentication and authorization, such as a client account authorization level, an authentication token issued by the identity provider device 120, an access token issued by the authentication platform 130, etc. The collected information may additionally be related to the API request itself, such as identification information of the API being called, a time the API is called, an API request count (as measured against the API's rate limit), etc. The collected information may further include any other information received as part of the message or API request. The collected information may be analyzed to identify trends or patterns associated with API requests associated with potential harmful activity.

Additionally and/or alternatively, the collected information may be used by the quarantine device 160 to train one or more machine learning models to better recognize such potential harmful activity. For instance, the machine learning training module 163 may use the collected information as training data to train or refine one or more machine learning models to provide the most accurate predictions on whether an API request is associated with potential harmful activity. This process is described in more detail with respect to FIG. 4.

The private network 191 may be operated by, and internal to, an entity such as a service provider hosting the service provider system 102. The private network 191 may be one or more networks used to interconnect one or more computing devices internal to the entity, such as the gateway device 140, the application services device 150, the quarantine device 160, and/or the database 170. The private network 191 may include one or more of local area networks (LANs), wide area networks (WANs), virtual private networks (VPNs), wireless telecommunication networks, and/or any other communication network. The private network 191 may further connect to the public network 192 via the gateway device 140.

The public network 192 may connect one or more of the computing devices connected to the private network 191, to one or more networks, systems, and/or computing devices that might not be associated with the entity associated with the private network 191. For instance, the public network 192 may connect the service provider system 102 to the client device 110, the identity provider device 120, and/or the authentication platform 130. The public network 192 may include the Internet.

Although shown separately, one or more of the devices shown in the computing environment 100 may be implemented as any configuration of devices, including as a single device and/or as a plurality of devices. For example, the quarantine device 160 and the service provider system 102 may be the same device.

Figure 2:
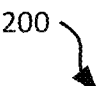
FIG. 2 shows an example computing device, in accordance with one or more aspects described herein.
Figure 2:
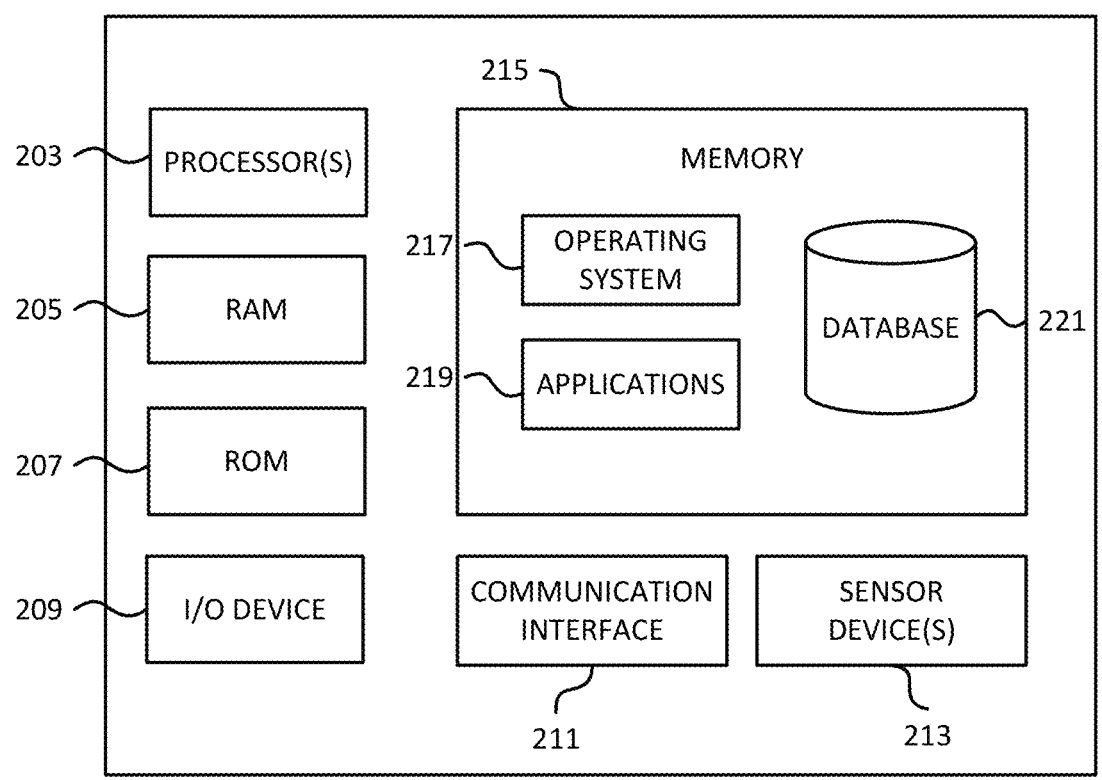

Referring to FIG. 2, an example computing device 200, which may be used in accordance with one or more aspects described herein, is shown. The computing device 200 may include or incorporate any one of the devices of FIG. 1, such as the client device 110, the identity provider device 120, the authentication platform 130, the service provider system 102, the gateway device 140, the application services device 150, the quarantine device 160, and/or the database 170. The computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

The computing device 200 may include one or more components, such as one or more processors 203, a random-access memory (RAM) 205, a read-only memory (ROM) 207, an input/output (I/O) device 209, a communication interface 211, one or more sensor devices 213, and a memory 215. The computing device 200 may include one or more additional or different components.

The one or more processors 203 may be configured to control overall operation of the computing device 200 and its associated components. A data bus (not shown) may interconnect the one or more processors 203, the RAM 205, the ROM 207, the I/O device 209, the communication interface 211, the one or more sensor devices 211, and/or the memory 215. The one or more processors 203 may include a single central processing unit (CPU), which may be a single-core or multi-core processor, or may include multiple CPUs. The one or more processors 203 and associated components may control the computing device 200 to execute a series of computer-readable instructions to perform some or all of the processes disclosed herein. Although not shown in FIG. 2, various elements within the memory 215 or other components in the computing device 200, may include one or more caches, for example, CPU caches used by the one or more processors 203, page caches used by operating system 217, disk caches of a hard drive, and/or database caches used to cache content from database 221. For embodiments including a CPU cache, the CPU cache may be used by the one or more processors 203 to reduce memory latency and access time. The one or more processors 203 may retrieve data from or write data to the CPU cache rather than reading/writing to the memory 215, which may improve the speed of these operations. In some examples, a database cache may be created in which certain data from the database 221 may be cached in a separate smaller database in a memory separate from the database 221, such as in the RAM 205 or on a separate computing device. For instance, in a multi-tiered application, a database cache on an application server may reduce data retrieval and data manipulation time by not needing to communicate over a network with a back-end database server. These types of caches and others may be included in some cases, and may provide potential advantages in certain implementations of devices, systems, and methods described herein, such as faster response times and less dependence on network conditions when transmitting and receiving data.

The input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output.

The communication interface 211 may include one or more transceivers, digital signal processors, and/or additional circuitry and software for communicating via a network, wired or wireless, using any protocol as described herein.

The one or more sensor devices 213 may include one or more of an accelerometer, a gyroscope, a GPS device, a biometric sensor, a proximity sensor, an image capturing device, a magnetometer, etc.

The memory 215 may store software to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random-access memory (RAM) 205, read-only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Although various components of computing device 200 are described separately, functionality of the various components may be combined and/or performed by a single component and/or multiple computing devices in communication without departing from the invention.

FIGS. 3A-3I show an example event sequence for performing one or more harmful activity determination and quarantining functions. The example event sequence may include a sequence of events occurring between one or more devices of the computing environment 100, such as the client device 110, identity provider device 120, authentication platform 130, gateway device 140, application services device 150, and quarantine device 160. That said, as indicated above, this event sequence may be performed on a single device. Moreover, the event sequence illustrated in FIGS. 3A-3I is illustrative, such that events need not be performed in the exact order shown.

Figure 3A:
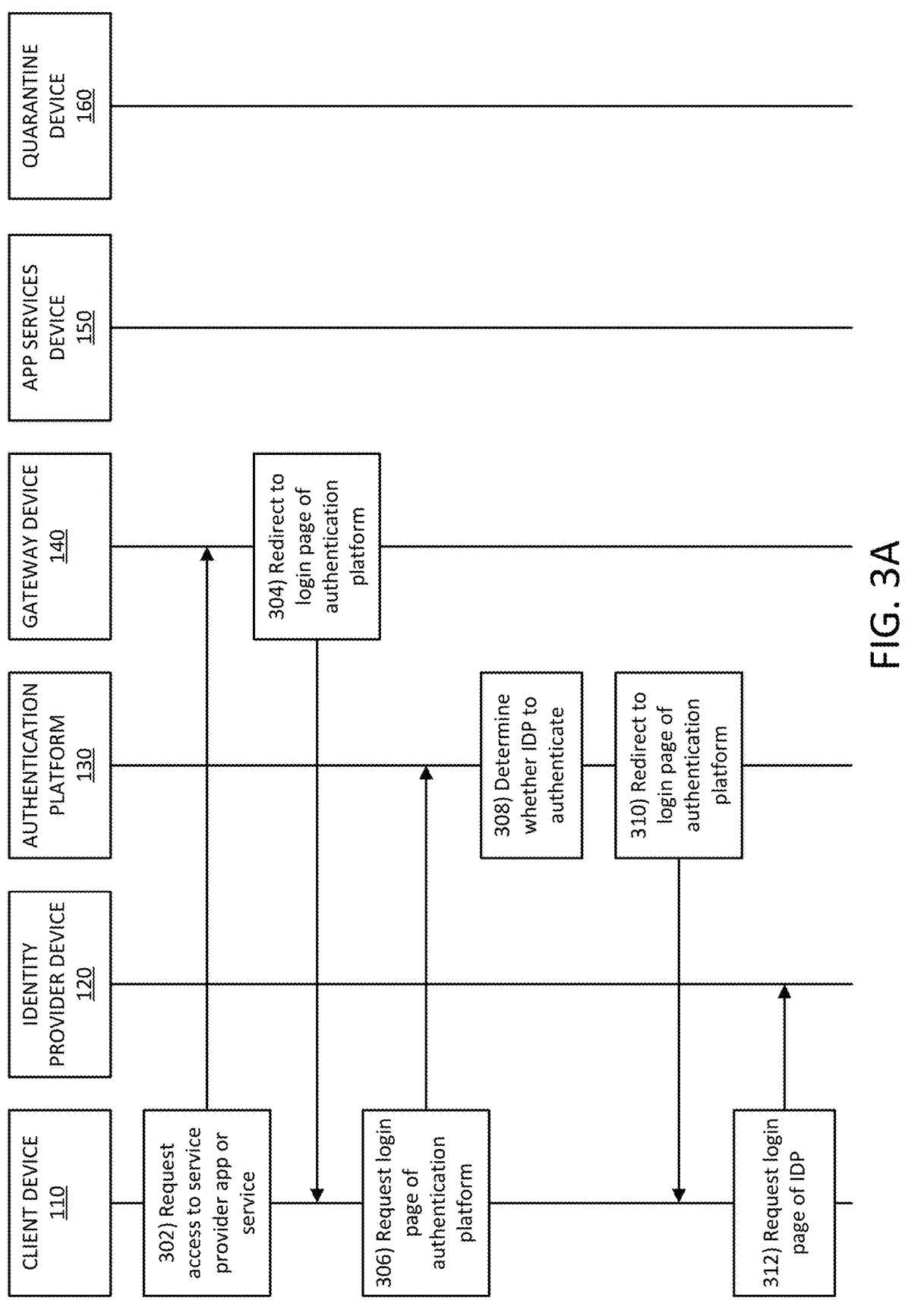
FIGS. 3A, 3B, 3C, 3D, 3E, 3F, 3G, 3H, and 3I show an example event sequence for performing harmful activity determination and quarantining functions, in accordance with one or more aspects described herein.

Referring to FIG. 3A, at step 302, a user or client, using the client device 110, may open a browser or other application to log in to or request access to an application or service hosted by the service provider system 102, such as one of the applications 180. For instance, a user may want to access an application 180 provided by the service provider system 102, such as a software as a service (SaaS) application. The application 180 or service may be, for example, an account lookup service, a customer information service, a transaction authorization service, customer relationship management (CRM) service, an email service, a project management service, or any other service or application. In some cases, the user might not be a human logging into a browser or other application, but may instead be another application, device, or system requesting access to the application 180 hosted by the service provider system 102. Accordingly, the requesting application at the client device 110 may send a message requesting access to an application or service hosted by the service provider system 102. The message may include an API request intended to interface with the requested application 180. The gateway device 140 may protect access to the service provider system 102 and to a private network connected thereto, such as the private network 191. Accordingly, the message may initially be received by the gateway device 140. Upon receiving the access request message from the client device 110, the gateway device 140 may determine whether the client is properly authenticated for access to the requested application 180. The gateway device 140 may make this determination based on an access token provided in the message. If an access token is provided, the sequence may proceed to step 324.

At step 304, the gateway device 140 may send a message back to the requesting application at the client device 110, redirecting the requesting application to a login page associated with the authentication platform 130. For instance, the authentication platform 130 may be an internal or external platform used by the service provider system 102 to provide authentication and/or authorization services on behalf of the service provider system 102. As an example, the authentication platform 130 may be AUTH0.

At step 306, the requesting application at the client device 110 may send, to the authentication platform 130, a message including a request for the login page associated with the authentication platform 130.

At step 308, the authentication platform 130 may determine whether the client is required to authenticate with an IdP. For instance, the client may provide a username, and the authentication platform 130 may determine whether a domain associated with the username may be associated with a domain serviced by a particular identity provider. For instance, the client may be an employee at Company A and may be requesting access, via Company A's system, to a service hosted at the service provider system 102. To access the requested service, the employee may be required to log in to Company A's system. In such an example, Company A may rely on a particular IdP to provide authentication services on their behalf.

At step 310, if the authentication platform 130 determines that the client is required to authenticate with an IdP, the authentication platform 130 may send a message back to the client device 110 redirecting the requesting application to a login page associated with the IdP, such as a login page provided by the identity provider device 120.

At step 312, the requesting application at the client device 110 may send a message to the identity provider device 120 with a request for the login page associated with the identity provider device 120.

Figure 3B:
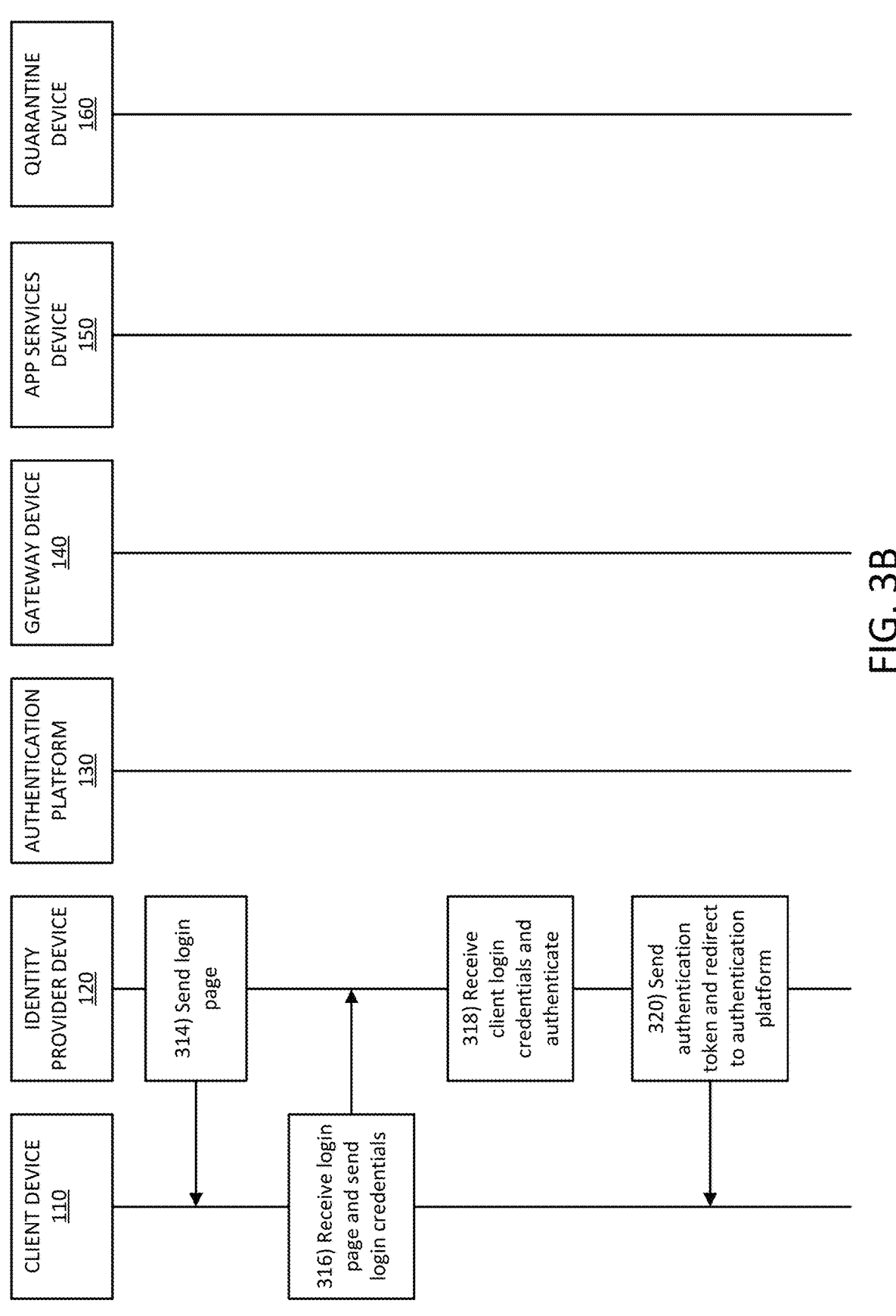

Referring to FIG. 3B, at step 314, the identity provider 120 may send the login page to the client device 110.

At step 316, the client device 110 may receive the login page from the identity provider 120. The requesting application at the client device 110 may send a message to the identity provider device 120 providing the client's login credentials.

At step 318, the identity provider device 120 may receive the client's login credentials and may perform an authentication process to authenticate the client. Upon successful authentication, the identity provider device 120 may issue an authentication token indicating the client's successful authentication with the identity provider device 120.

At step 320, the identity provider device 120 may send a message back to the requesting application at the client device 110. The message may indicate that the client has been successfully authenticated and may include the authentication token and instructions redirecting the requesting application back to the authentication platform 130.

Figure 3C:
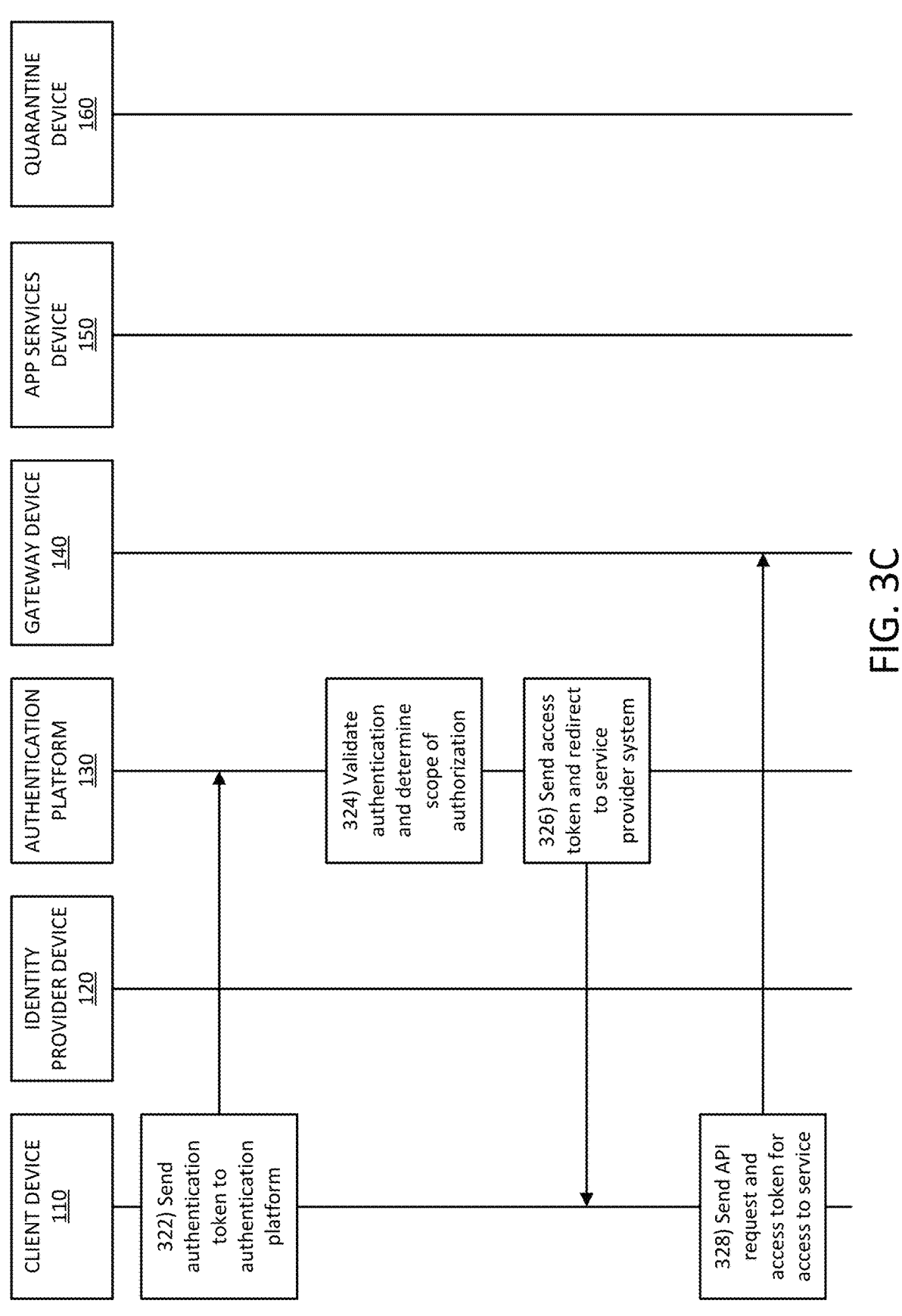

Referring to FIG. 3C, at step 322, upon receipt of the indication of successful authentication, the requesting application at client device 110 may send, to the authentication platform 130, a message including the authentication token issued by the identity provider device 120. The authentication token may inform the authentication platform 130 that the client was successfully authenticated.

At step 324, the authentication platform 130 may, on behalf of the service provider, validate the identity provider's authentication token. Upon successful validation, the authentication platform 130 may determine a scope or level of authorization associated with the client, e.g., what services, applications, resources, devices, data, etc. the client has permission to access and what type or level of corresponding access the client has. In some cases, the client might not need to authenticate with an identity provider and, instead, the authentication platform 130 may perform the authentication of the client's login credentials. In this case, steps 310-318 may be skipped and at step 324, the authentication platform 130, upon successfully authenticating the client on its own, may determine the scope or level of authorization associated with the authenticated client. After confirmation that the client is successfully authenticated (either by the identity provider device 120 or by the authentication platform 130), the authentication platform 130 may issue an access token indicating that the client is authenticated and the client's authorization level.

At step 326, the authentication platform 130 may send a message back to the requesting application at the client device 110. The message may include the access token issued by the authentication platform 130 and instructions redirecting the requesting application to the service provider system 102.

At step 328, after receiving the message including the access token from the authentication platform 130, the client device 110 may send, to the service provider system 102 and (in some instances) via the gateway device 140, a message including a request for access to the application 180 (e.g., the requested application/service referred to at step 302). The request may be an API request that complies with an API configured to interface with the requested application 180. The API request may be to perform a specific action associated with a particular application 180, such as to update a particular customer record using Application 1 of the applications 180. The message may additionally include the access token issued by the authentication platform 130.

Figure 3D:
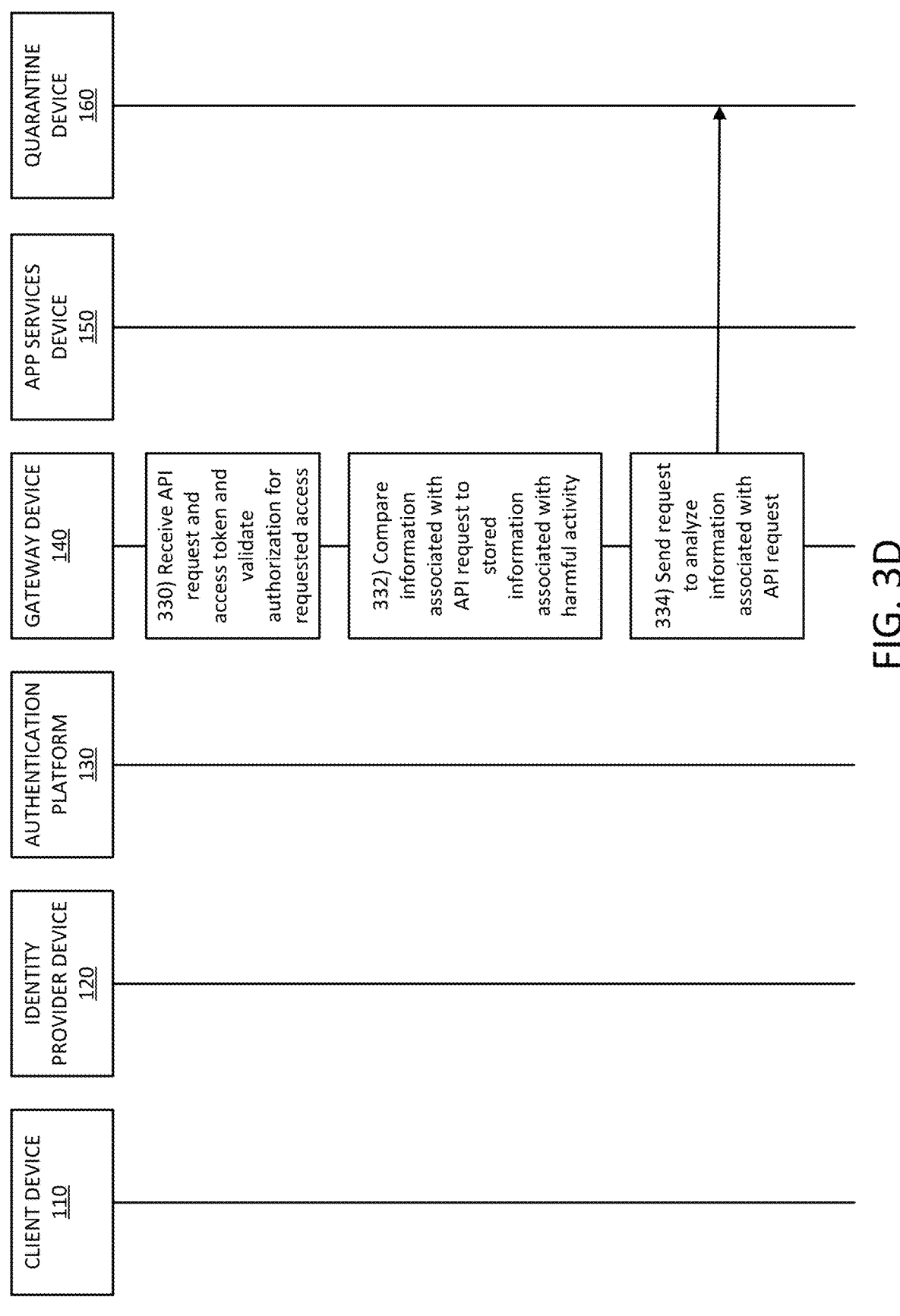

Referring to FIG. 3D, at step 330, the gateway device 140 may receive the message including the API request along with the access token. The access token may serve as a credential for the client attempting to access the API. The gateway device 140 may use the access token to determine whether the client is authorized to access the requested API and/or application 180 and whether the scope of authorization indicated by the access token permits the client to perform the specific requested actions. For example, whether the client is permitted to access the requested Application 1 of the applications 180 and whether the scope of authorization allows the client to update customer records.

In conventional systems, upon determining that the client is appropriately authorized to access the requested API to perform the requested actions, the gateway device 140 may route the API request to the appropriate application 180. The application 180 may process the API request and return a response to be sent back to the client device 110. However, in accordance with aspects of the present disclosure, before routing the API request to the appropriate application 180, the gateway device 140 may first determine whether the API request is associated with potential harmful activity (e.g., a previously-determined threat, suspicious behavior, a compromised client or client account, software bugs/errors, or the like). The API request need not itself evince malicious or harmful activity: the API request itself may be a well-constructed and correctly formatted request and free from error. Moreover, along those lines, the message comprising the API request may include a valid access token, but there may yet be some external or other indication that the message, the request, the client, etc. is associated with potential harmful activity.

The gateway device 140 may determine whether the API request may be associated with potential harmful activity in one or more ways. For instance, the gateway device 140 may determine whether the API request is associated with potential harmful activity based on comparing information associated with the API request to stored information associated with potential harmful activity. For instance, at step 332, the gateway device 140 may access a database, such as the database 170, associated with the service provider system 102 and retrieve or receive information indicating one or more client accounts or internet protocol (IP) addresses known or suspected of being associated with potential harmful activity. Such information may have been previously obtained from a third-party device or system and may have been automatically transmitted to the database 170 or may have been entered manually by a system administrator of the service provider system 102. The gateway device 140 may determine from the message, the access token, and/or the API request an identifier of the client account and/or the IP address of the server or device making the API request. The gateway device 140 may compare the determined client account and/or IP address with the information stored in the database 170 indicating one or more client accounts or IP addresses known or suspected of being associated with potential harmful activity to determine if the API request is associated with potential harmful activity.

Additionally or alternatively, the gateway device 140 may determine whether the API request is associated with potential harmful activity based on an analysis of the API request. For instance, at step 334, the gateway device 140 may send information associated with the API request and/or the message comprising the API request to the quarantine device 160 with a request for the quarantine device 160 to analyze the information and make a determination regarding whether the API request is likely associated with potential harmful activity.

Figure 3E:
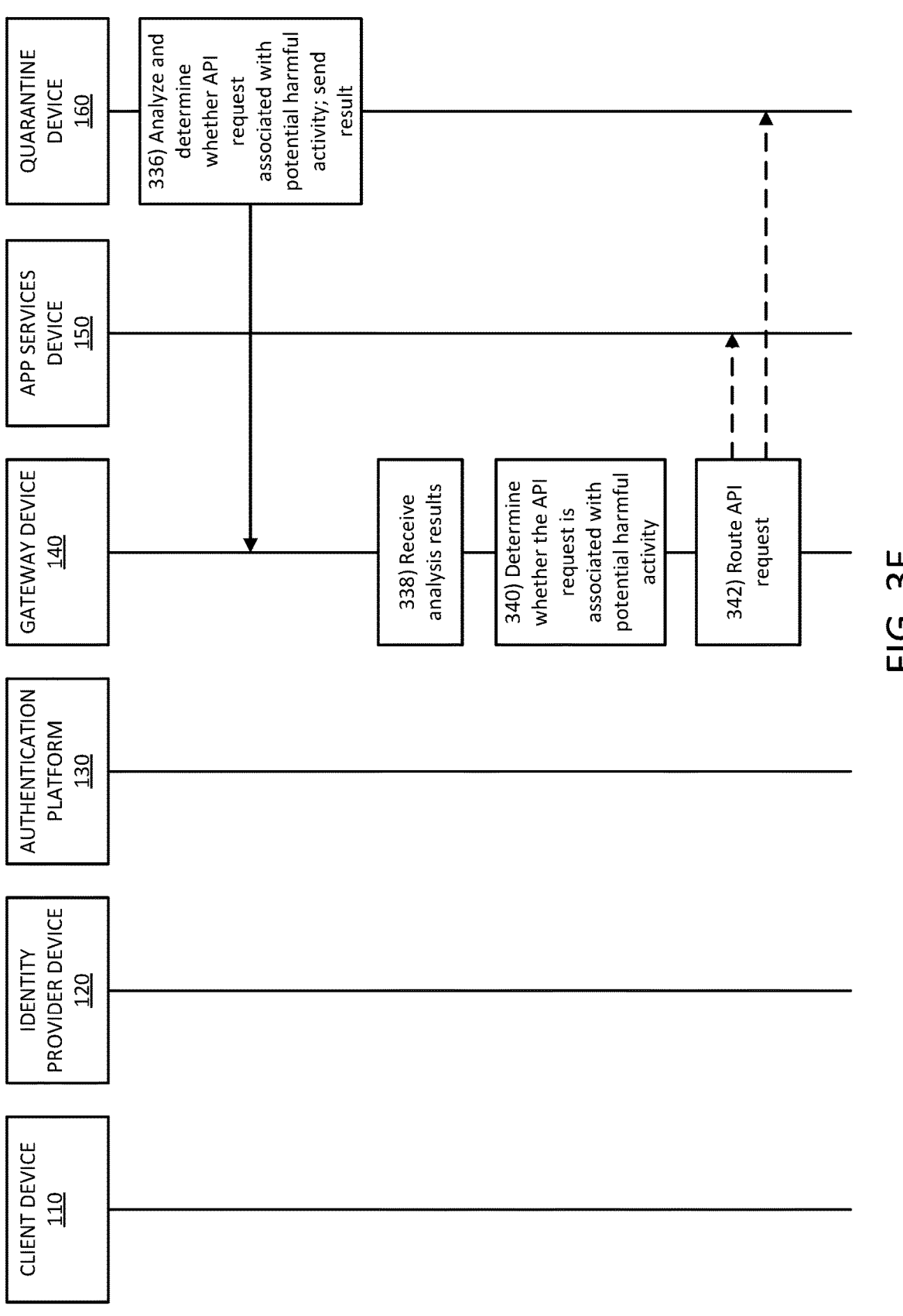
Figure 3F:
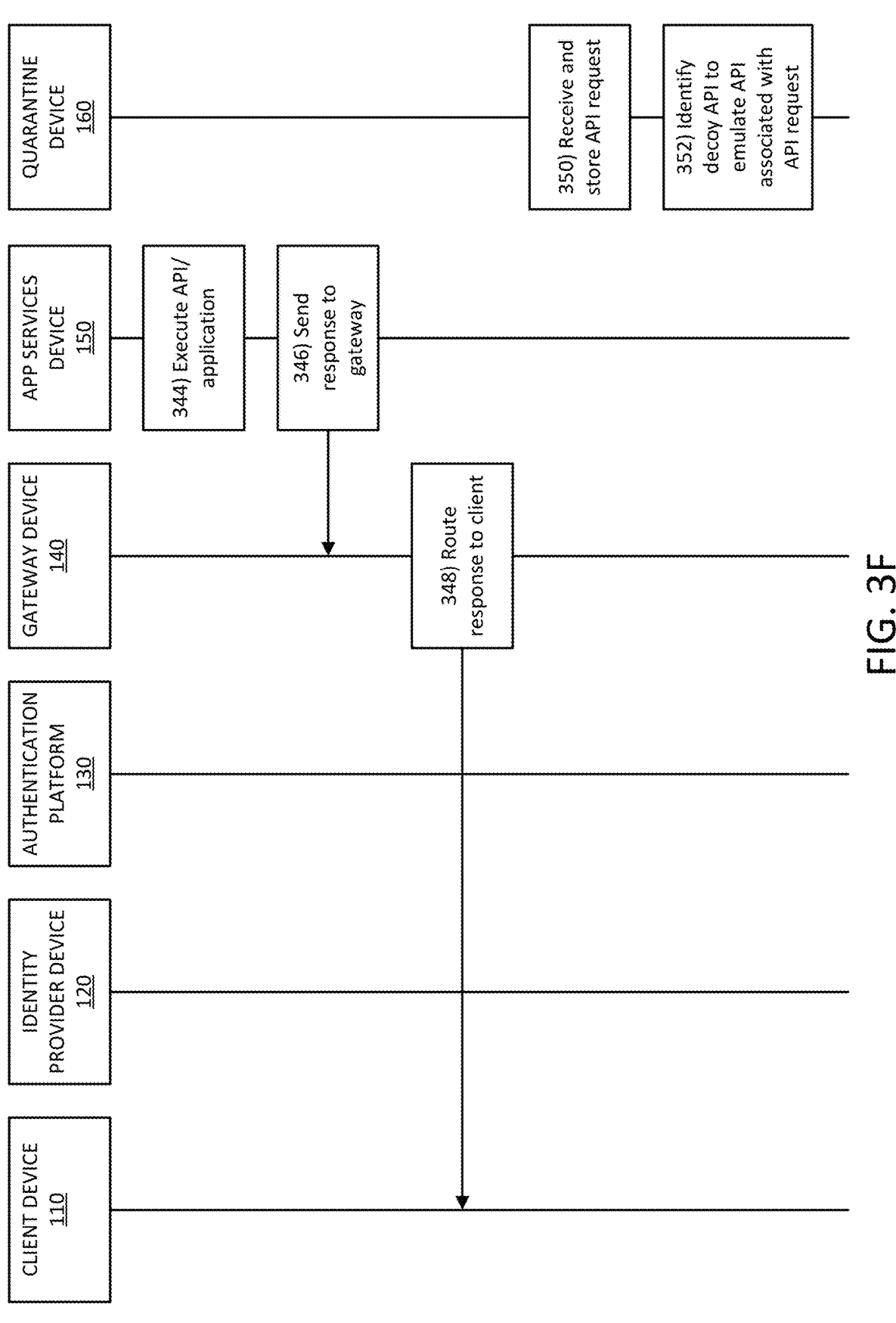

Referring to FIG. 3E, at step 336, the quarantine device 160 may receive the request and may utilize the quarantine decisioning module 164 to analyze the information and make a determination regarding whether the API request is likely associated with potential harmful activity. The quarantine decisioning module 164 may use various algorithms to analyze the API request. As an example, the service provider system 102 may define algorithms related to usage limits associated with an API. For instance, a client device 110 may be limited to calling an API a maximum number of times per period of time, e.g., a maximum number of calls-per-minute, calls-per-day, etc. If it is determined that such usage limits are exceeded by a threshold amount, a determination that the API request is likely associated with potential harmful activity may be triggered. In some cases, the quarantine decisioning module 164 may use one or more machine learning models (described in further detail with respect to FIG. 4) to determine whether the information associated with the API request fits with historical patterns of malicious or harmful requests, or requests prone to software errors, bugs, or otherwise unexpected activity. Based on its analysis, the quarantine device 160 may make a determination about whether the API request is likely associated with potential harmful activity and may send the result back to the gateway device 140. The result may include a probability or confidence score indicating a likelihood that the API request is associated with potential harmful activity.

At step 338, the gateway device may receive the results from the analysis performed by the quarantine device 160.

At step 340, the gateway device 140 may determine whether the API request is associated with potential harmful activity. For instance, the gateway device 140 may make the determination based on the comparison of the information associated with the API request to the stored information associated with potential harmful activity and/or based on the results of the analysis by the quarantine device 160, such as whether the provided likelihood or confidence score that the API request is associated with potential harmful activity satisfies a threshold.

At step 342, the gateway device 140 may route the API request. The gateway device 140 may make a determination about where to route the request and/or corresponding message based on whether the API request is associated with potential harmful activity.

For instance, if the gateway device 140 determines that the API request is not associated with potential harmful activity, then the gateway device 140 may route the API request and/or corresponding message, via the application services device 150, to the appropriate API and/or application 180. In this case, referring to FIG. 3F, at step 344, the applications services device 150 may receive the API request and the appropriate API and/or application 180 may be executed. The application 180 may generate a response to the API request. At step 346, the response may be routed, via the gateway device 140, for transmission to the client device 110. At step 348, the gateway device 140 may receive the response and route the response to the client device 110.

On the other hand, if the gateway device 140 determines that the API request is associated with potential harmful activity, then the gateway device 140 may block the API request from being routed to the application services device 150, thereby, preventing performance of steps 344-348, so that the requested API and/or application 180 does not get executed and does not send a response to the client device 110. However, rather than simply blocking the API request from being routed to the application services device 150 and reaching the requested API and/or application 180, as might be done in conventional systems, the gateway device 140 may, instead, try to elicit further communication from the client device 110 by responding to the API request with dummy or decoy responses, in order to gather additional information and better assess the potential harmful activity. This may be useful for determining the origins of a threat and/or for assessing patterns and trends associated with such activity to better detect such harmful activity or threats in the future. To accomplish this, referring back to FIG. 3E, at step 342, the gateway device 140 may route the API request and the message comprising the API request (along with subsequent API traffic from the client, at least for a period of time)

to the quarantine device 160. The quarantine device 160 may be a device separate from the service provider system 102 or may be a component of one or more of the devices of the service provider system 102. Routing the API request to the quarantine device 160 may prevent the API request from reaching the requested API and/or application 180 and posing a risk or threat to that environment. Routing the API request to the quarantine device 160 may further prevent the client device 110 from receiving a response or data from the requested application 180. In this way, production applications, services, and the corresponding data may be walled-off and protected from potential harmful activity, while still being up and available for use by other clients.

Referring again to FIG. 3F, at step 350, the quarantine device 160 may receive the message comprising the API request. Upon receiving the message, the quarantine device 160 may collect and store information associated with the message and the associated API request. The collected information may be used to develop analytics associated with potential harmful activity or may be used to train the quarantine device 160 to better recognize such potential harmful activity (as described in further detail with respect to FIG. 4). For instance, the quarantine device 160 may collect as much relevant information as it may receive via the message and/or the API request. This information may vary based on data included in the API request and may include, but need not be limited to, a client account identifier, a client account name, a client account authorization level, the authentication token issued by the identity provider device 120, the access token issued by the authentication platform 130, destination and source IP addresses, destination and source port numbers, a geographical location associated with the client device 110 (e.g., city, region, country, longitude, and/or latitude), destination and source media access control (MAC) addresses, a requesting application, an operating system, a vendor, a user agent, the API being called, a time the API is called, an API request count (as measured against the API's rate limit), and/or other information received as part of the message or API request.

At step 352, the quarantine device 160 may employ a quarantine decisioning module 164 to identify a decoy API that is configured to emulate or mimic the API called in the API request. The decoy API, however, may perform one or more quarantine functions instead of performing the normal function of the requested API. For instance, the quarantine device 160 may store information mapping each of various APIs hosted by the application services device 150 to a corresponding decoy API. The mapping may be a mapping of the root or base endpoint of the requested API (i.e., the production API) to the root or base endpoint of the decoy API. For instance, an API for Application 1 of the applications 180 may be associated with a base endpoint of "http://api.application1.com" and an API for Application 2 of the applications 180 may be associated with a base endpoint of "http://api.application2.com." As shown below in Table 1, the quarantine device 160 may store information mapping the endpoints of production APIs and corresponding decoy APIs.

TABLE 1

| Requested API | Decoy API |
|---|---|
| http://api.application1.com | http://decoy_api.application1.com |
| http://api.application2.com | http://decoy_api.application2.com |

In some cases, such as shown below in Table 2, the requested API may be mapped to more than one decoy API, each providing one or more different quarantine functions.

TABLE 2

| Requested API | Decoy API | Quarantine Function |
|---|---|---|
| http://api.application1.com | http://decoy_api1.application1.com | Quarantine function 1 |
| http://api.application1.com | http://decoy_api2.application1.com | Quarantine function 2 |
| http://api.application2.com | http://decoy_api1.application2.com | Quarantine function 1 |
| http://api.application2.com | http://decoy_api2.application2.com | Quarantine function 2 |
| http://api.application2.com | http://decoy_api3.application2.com | Quarantine function 3 |

Each of the quarantine functions may perform different actions and may be used, for example, to notify the client device 110 of the block or to elicit further communication from the client device 110 so that additional information may be collected for assessing the potential threat.

Quarantine functions used to notify of the block may generate a response directing the browser of the client device 110 to a page indicating that an error or snag has been encountered or that access to the requested application 180 is not permitted.

Quarantine functions used to elicit further communication from the client device 110 may generate a response directing the requesting application of the client device 110 to a page that presents a challenge question or requests additional authentication information, such as biometric information (e.g., a fingerprint scan, facial scan, retinal scan, etc.), contact information, such as a phone number or email address for sending a one-time password, or the like. Quarantine functions used to elicit further communication may, additionally or alternatively, generate one or more responses that mimic a response from the requested application 180, but which uses dummy or fake data instead. For instance, the quarantine function may be a call to a decoy application 166 which mimics the behavior of the requested application 180, but instead of accessing real production data, may instead access dummy or fake data. The decoy application 166, however, may otherwise behave in a similar manner as the corresponding requested application 180 so that the client might not become aware that the potential harmful activity has been detected.

The quarantine device 160 may identify the decoy application 166 to use based on determining the most appropriate quarantine function to be used. This determination may be based on the particular API request (e.g., what the client device 110 is attempting to access or do), a risk associated with the request, and/or a sensitivity associated with the requested data. For instance, an API request to retrieve data identifying products offered by the service provider system 102 may be a less risky request than one requesting to retrieve data for a large number of customer accounts managed by the service provider system 102. Accordingly, a risk level associated with the API request may be determined based on the action to be performed and/or the data to be accessed. For instance, an API request that attempts to update, delete, or write/create data may be determined to have a higher risk level than an API request that attempts to retrieve data. Likewise, an API request that attempts to access highly sensitive data may be determined to have a higher risk level than an API request that attempts to access data of low sensitivity. Similarly, an amount or quantity of data or records to be accessed may also be a factor in determining a risk level associated with an API request. As an example, factors such as shown below in Table 3 may be used in determining the risk level associated with the API request.

TABLE 3

| API Method | Number of Records | Data Sensitivity | Risk Level |
|---|---|---|---|
| Retrieve data | $<x$ | Low | 1 |
| Retrieve data | $>=x$ | Low | 2 |
| Create, update, or delete data | $<x$ | Low | 3 |
| Create, update, or delete data | $>=x$ | Low | 4 |
| Retrieve data | $<y$ | Medium | 2 |
| Retrieve data | $>=y$ | Medium | 3 |
| Create, update, or delete data | $<y$ | Medium | 4 |
| Create, update, or delete data | $>=y$ | Medium | 5 |
| Retrieve data | $<z$ | High | 4 |
| Retrieve data | $>=z$ | High | 4 |
| Create, update, or delete data | $<z$ | High | 5 |
| Create, update, or delete data | $>=z$ | High | 5 |

The determined risk level of the API request may be used for selecting the most appropriate quarantine function and corresponding decoy API. For instance, as shown below in Table 4, the database 170 may store a risk level range associated with the particular decoy API and corresponding quarantine function. The determined risk level of the API request may be compared to this risk level range to select the appropriate decoy API to be used.

TABLE 4

| Requested API | Decoy API | Quarantine function | Risk Level Range |
|---|---|---|---|
| http://api.application1.com | http://decoy_api1.application1.com | Quarantine function 1 | 1-3 |
| http://api.application1.com | http://decoy_api2.application1.com | Quarantine function 2 | 4-5 |
| http://api.application2.com | http://decoy_api1.application2.com | Quarantine function 1 | 1 |
| http://api.application2.com | http://decoy_api2.application2.com | Quarantine function 2 | 2 |
| http://api.application2.com | http://decoy_api3.application2.com | Quarantine function3 | 3-5 |

Figure 3G:
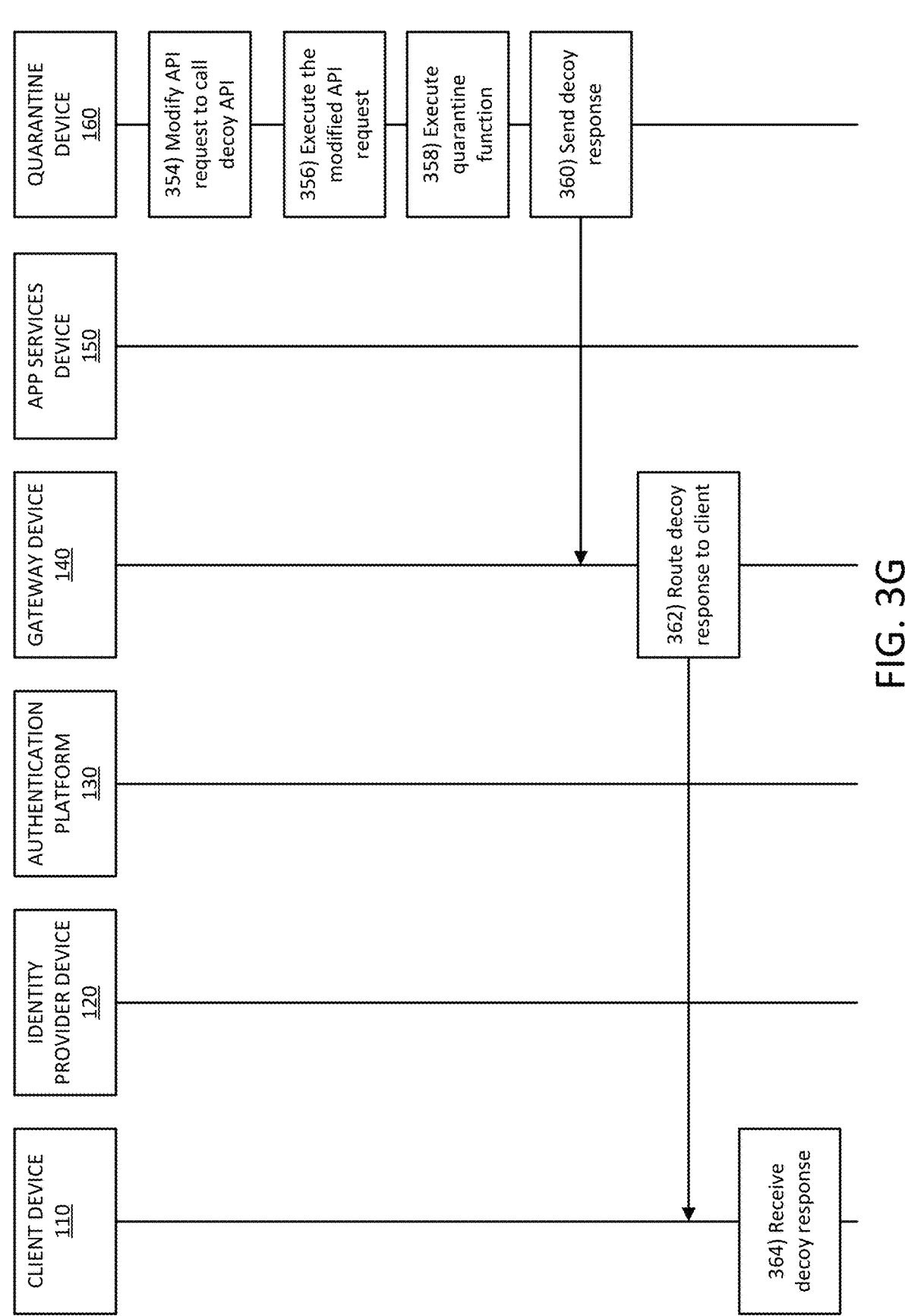

Referring to FIG. 3G, at step 354, the API request routed to the quarantine device 160 may be modified to replace the requested API with the decoy API. For instance, the decoy API may be configured to be called using the same structure, variables, parameters, headers, etc. as the API being called in the API request. A call to the decoy API may differ from a call to the corresponding requested API with respect to the endpoint indicated therein, but the remaining structure of the call to the decoy API may otherwise be the same as the call to the corresponding real/requested API. As a simplified example, if an API request calling the API "http://api.application1.com/transactions/users" to access the application "Application1" to retrieve transaction information for customer "123" is made using "GET http://api.application1.com/transactions/user?id=123" then the corresponding decoy API may be called in a similar manner, such as "GET http://decoy_api.application1.com/transactions/user?id=123."

At step 356, the quarantine device 160 may cause the modified API request to be executed. The modified API request may call the decoy API and the decoy API may be executed at the quarantine device 160, which, as previously discussed, may be a sandbox environment that is separate from an environment in which the requested API would normally be executed in and separate from an environment containing the application 180 requested by the client device 110 via the API request. The sandbox environment may be an environment designed to mirror a production environment, such as an environment of the service provider system 102. The sandbox environment may comprise similar data structures, applications, APIs, etc. as the corresponding production environment, but the applications and/or APIs may perform different functions, and the data structures may store different data, such as non-production, fake, or dummy data, which may be used by the applications in the environment.

At step 358, the quarantine device 160 may cause the quarantine function to be executed. That is, executing the modified API request may cause one or more associated quarantine functions to be called and executed (such as provided in Table 2). The one or more quarantine functions may perform one or more actions related to notifying the client device 110 that the API request has been blocked or eliciting further communication from a requesting application or the user of the client device 110 so that additional information may be collected for assessing the potential threat.

As one example, the one or more quarantine functions may generate a response to the modified API request, which directs the requesting application at the client device 110 to a page that displays a message indicating that an error or snag has been encountered or that access to the requested application 180 is not permitted.

As another example, the one or more quarantine functions may generate a response to the modified API request, which directs the requesting application at the client device 110 to a page that requests additional authentication information from the client. For instance, the page may present a challenge question or request further authentication information, such as biometric information (e.g., a fingerprint scan, facial scan, retinal scan, etc.), contact information, such as a phone number or email address for sending a one-time password, or the like. There may be a different quarantine function associated with each of the different forms of additional authentication requests, and the quarantine function selected for use may be based on the risk level of the API request, as discussed above with respect to Table 4.

As an additional example, the one or more quarantine functions may be configured to generate responses that elicit information about the extent of the harmful or malicious activity. For example, the responses may request information that might reveal whether a malicious entity has stolen data (e.g., a database of stolen passwords), how the client device 110, identity provider device 120, the authentication platform 130, etc. may have been compromised, or the like. For instance, a prompt may be provided in which an answer might only be known if the malicious entity has stolen or accessed an otherwise privileged or protected database. For instance, the response may provide one or more prompts which elicit information related to username/address combination that is included in a database of stolen username, passwords, and addresses.

As a further example, the one or more quarantine functions may call a decoy application 166, which mimics a response from the application 180 requested by the original API request. The decoy application 166 may perform an expected function of the original API request or may behave as if it has performed an expected function of the original API request. For instance, if the original API request was a request to access Application 1, of the applications 180, to retrieve transaction information for Customer 123, the decoy application 166 may generate a response that mimics a response that would have been generated by Application 1, such as to return a specific type of data formatted in a particular manner. However, the response may include fake or dummy data instead of actual production data associated with requested Customer 123. As another example, if the original API request was to access Application 1, of the applications 180, to delete transaction information for Customer 456, the decoy application 166 may, instead of deleting any information, generate a response that mimics a response that would have been generated by Application1 had the data actually been deleted—such as a message indicating the data was successfully deleted.

At step 360, the decoy response generated by the quarantine function or by the associated decoy application 166 may be sent to the gateway device 140 to be routed back to the client device 110.

At step 362, the gateway device 140 may receive the decoy response and route the decoy response to the client device 110.

At step 364, the client device 110 may receive the decoy response. Because the decoy response was generated in a manner that may mimic a response that would have been generated by the API request sent by the client device 110, the client device 110 might not be aware that the decoy response is not a legitimate response from the requested application 180. As a result, the client device 110 may maintain its current posture and may continue to send additional API requests to the service provider system 102.

Figure 3H:
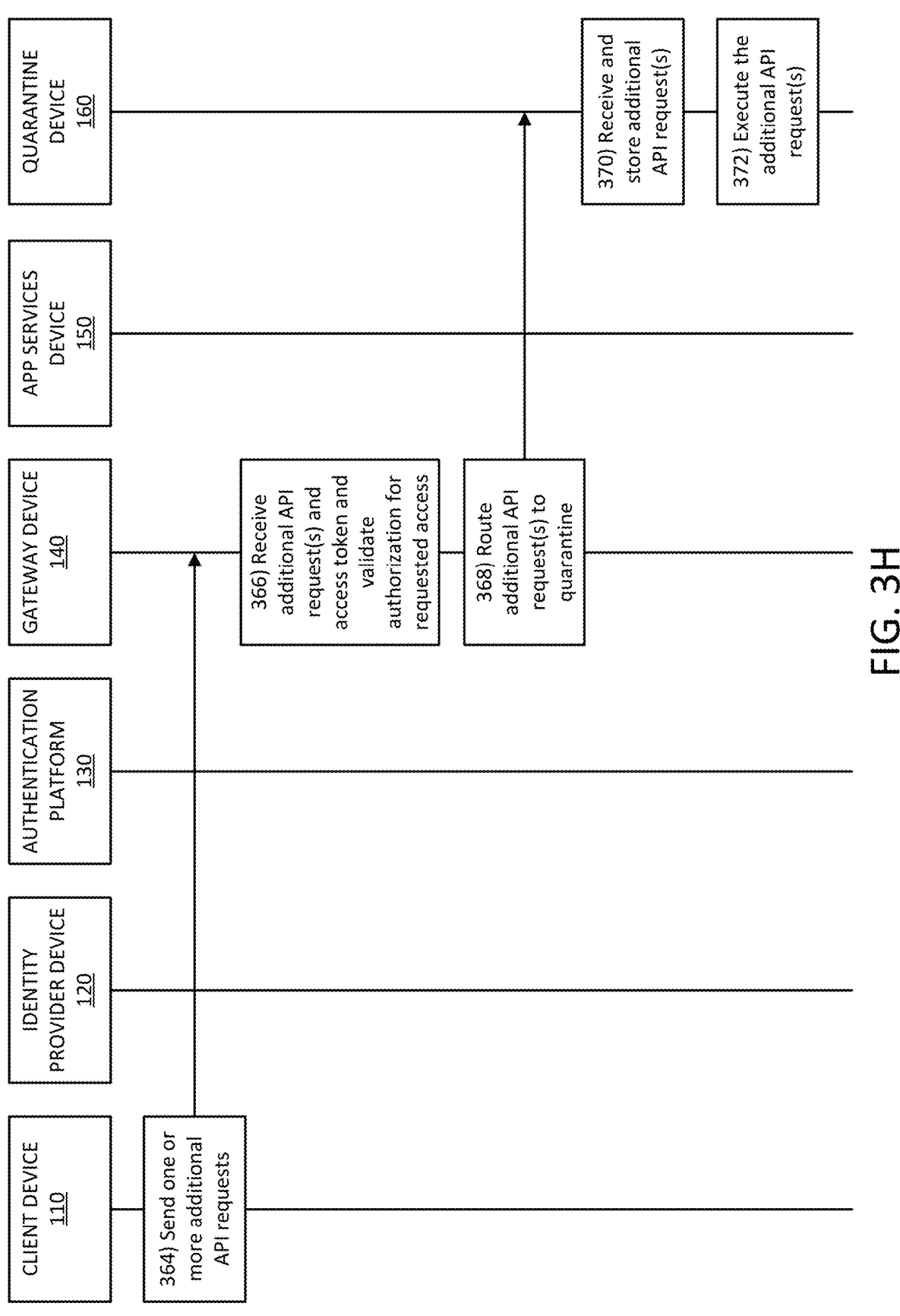

Referring to FIG. 3H, at step 364, based on the decoy response received by the client device 110, the client device 110 may send, to the service provider system 102, one or more additional messages including one or more additional API requests. For instance, if the decoy response directed the requesting application at the client device 110 to a page that presents a challenge question or requests further authentication information, the client device 110 may request access to the page and the page may present a user interface for the client to provide further authentication information or a response to a challenge question. The client may provide the requested information and the client application may cause an API request to be sent to the service provider system 102, via the gateway device 140. The API request may include the requested information, such as a response to a challenge question or second factor authentication information, such as a facial scan, a fingerprint scan, etc. The API request may further include the access token previously provided to the client device 110 by the authentication platform 130.

At step 366, the gateway device 140 may receive the message(s) including the additional API request(s) and access token, and determine whether the client is authorized to access the requested API and whether the scope of authorization indicated by the access token permits the client to perform the specific requested actions.

At step 368, the gateway device 140 may determine, based on the access token, that the client device 110 had previously been identified as being associated with potential harmful activity. The gateway device 140 may, accordingly, route the message(s) containing the additional API request(s) to the quarantine device 160. That is, after the initial identification of the client device 110 or client account being associated with potential harmful activity, all traffic from the client device 110 or client account may be automatically routed to the quarantine device 160 for a period of time.

At step 370, the quarantine device 160 may receive the message(s) comprising the additional API request(s). Upon receiving the message(s), the quarantine device 160 may store information associated with the message(s) and associated API request(s), such as described in step 350. In this case the decoy API may have solicited and caused the collection of additional information associated with the client associated with the harmful activity. This additional information may be further used to develop analytics associated with potential harmful activity or to train the quarantine device 160 to better recognize such potential harmful activity (as described with respect to FIG. 4). For instance, the client may have provided information in response to a challenge question or other prompt, or a request for further authentication information. As a result, the additional received information may, for example, include biometric information or contact information, such as a phone number or email address, of a malicious user, or information that might reveal whether a malicious entity has stolen data (e.g., a database of stolen passwords), how the client device 110, identity provider device 120, the authentication platform 130, etc. might have been compromised, or the like. Such information may be used to determine an identity of the malicious user and/or an extent of the malicious or harmful activity.

At step 372, the quarantine device 160 may cause the additional API request(s) to be executed. The additional API request(s) may call one more decoy APIs, which may be executed at the quarantine device 160.

Figure 3I:
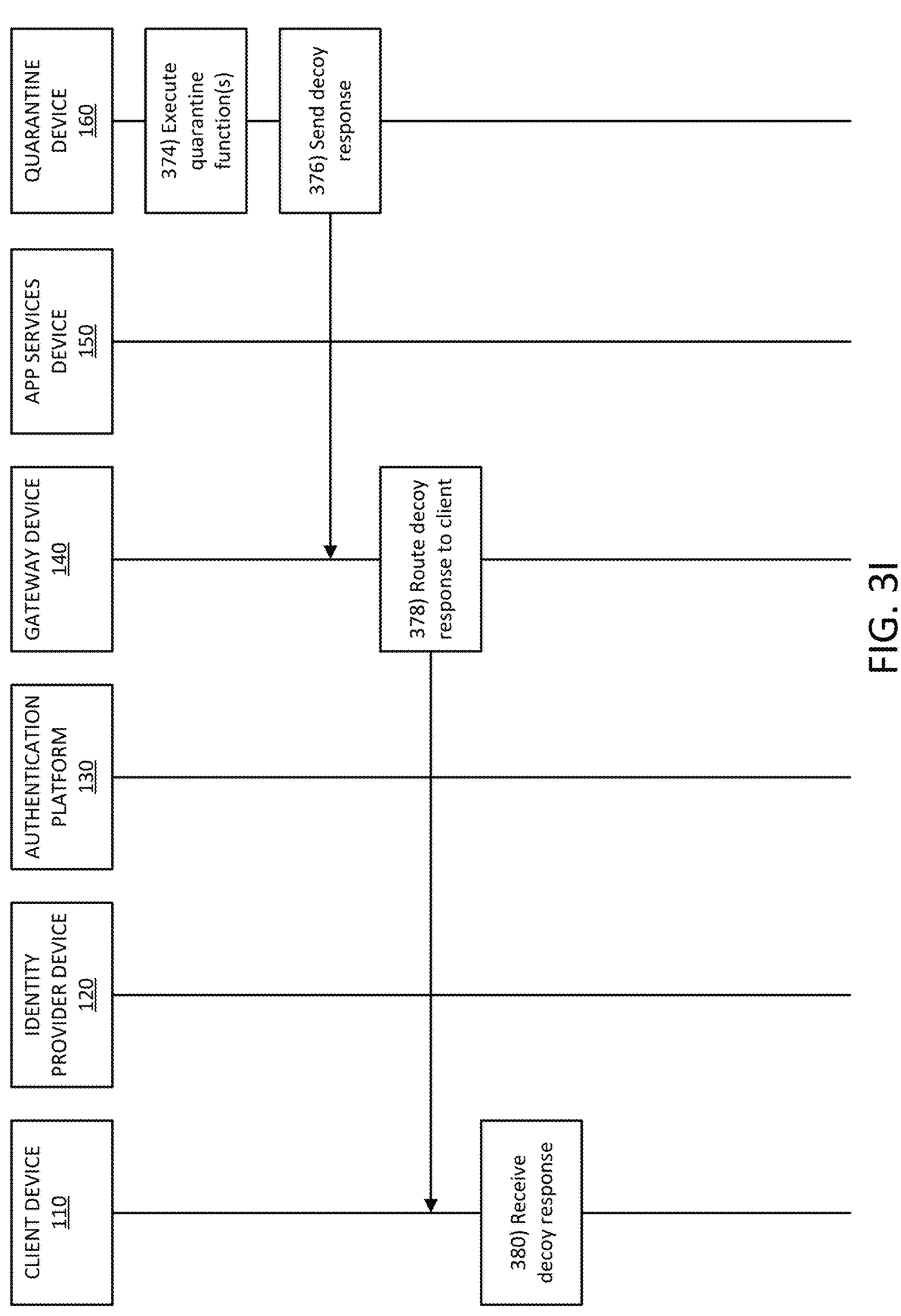

Referring to FIG. 3I, at step 374, the quarantine device 160 may cause one or more quarantine functions associated with the additional API request(s) to be executed. That is, executing the additional API request(s) may cause the associated quarantine function(s) to be called and executed and one or more decoy responses to be generated.

At step 376, the one or more decoy responses generated by the quarantine function(s) may be sent to the gateway device 140. At step 378, the gateway device 140 may route the decoy response(s) to the client device 110. At step 380, the client device 110 may receive the one or more decoy response. Steps 364-380 may, thereafter, be repeated as the client device 110 continues to communicate with the service provider system 102 for the period of time in which all traffic associated with the client device 110 or the client account is to be quarantined.

Figure 4:
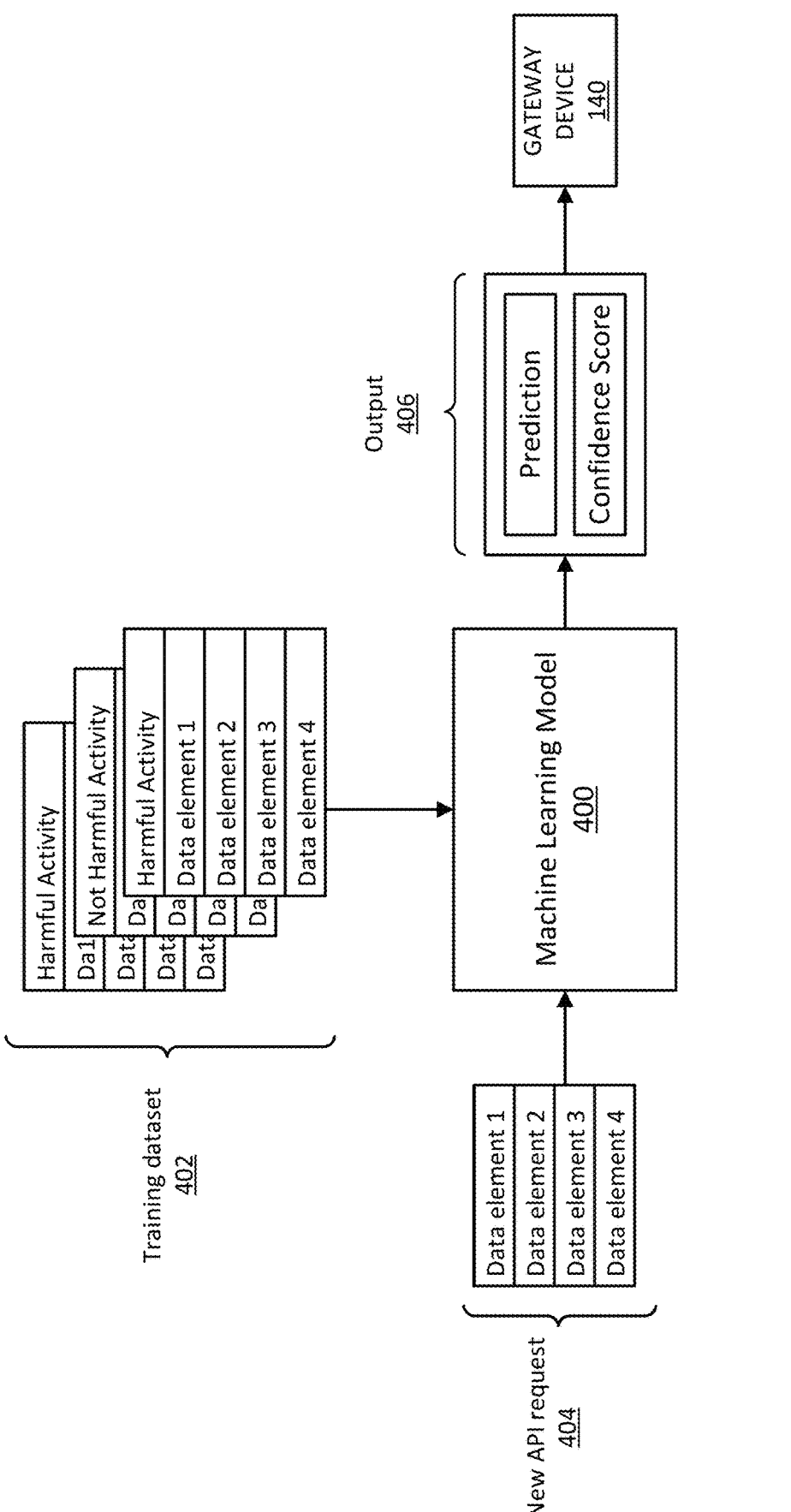
FIG. 4 shows an example process for training and utilizing a machine language model for performing harmful activity determinations, in accordance with one or more aspects described herein.

Referring to FIG. 4, an example process for training and utilizing a machine language model for performing harmful activity determinations is provided. The service provider system 102 and or the quarantine device 160 may utilize one or more machine learning models, such as machine learning model 400, to make determinations about whether an API request is likely associated with harmful activity.

Initially, the machine learning model 400 may be implemented on one or more computing devices, such as the quarantine device 160, and may be trained to identify patterns, sequences, relationships, and the like, associated with API requests that are associated with potential harmful activity and those that are not. The machine learning model 400 may comprise one or more algorithms including, but not limited to, supervised learning algorithms, unsupervised learning algorithms, regression algorithms (e.g., linear regression, logistic regression, etc.), instance based algorithms (e.g., learning vector quantization, locally weighted learning, etc.), regularization algorithms (e.g., ridge regression, least-angle regression, etc.), decision tree algorithms, Bayesian algorithms, clustering algorithms, artificial neural network algorithms, classification algorithms, ranking algorithms, etc.

The machine learning training module 163, of the quarantine device 160, may train the machine learning model 400 using one or more training datasets 402 comprising information collected from received messages comprising API requests and/or from the API requests themselves. The received messages comprising the API requests may be associated with different client accounts and may be API requests collected over a period of time.

In some cases, to train the machine learning model 400, the gateway device 140 may send, to the quarantine device 160, messages comprising API requests known to be associated with harmful activity. The gateway 140 may also send, to the quarantine device 160, messages comprising API requests known not to be associated with potential harmful activity. The gateway 140 may tag the API requests that it sends to the quarantine device 160 as "Harmful Activity" or "Not Harmful Activity." The machine learning training module 163 may generate one or more training datasets 402 based on such tagged information.

In other cases, training datasets 402 may be manually created with real or fake API requests (and/or corresponding messages) that are indicative of potential harmful activity. Each of the API requests in the training datasets 404 may be tagged as described above. The manually created training datasets 402 may also be sent to the quarantine device 160.

The training datasets 402 may include labeled data. That is, each training dataset 402 may include a record for each of the tagged API requests. Each record may include information associated with the API request, such as various data elements extracted from the message comprising the API request and/or from the API request itself, and additionally a corresponding label—e.g., "Harmful Activity" or "Not Harmful Activity." For example, a training dataset 402 record comprising information associated with an API request known to be associated with potential harmful activity may be labeled as "Harmful Activity," while a training dataset 402 record comprising information associated with an API request known not to be associated with potential harmful activity may be labeled as "Not Harmful Activity."

The machine learning training module 163 may input the training dataset into the machine learning model 400 to train or refine the model to output a likelihood that a newly received API request 404 is associated with potential harmful activity. For instance, the machine learning model 400 may utilize the training datasets to identify patterns, sequences, and/or relationships in the training data sets, so as to train the model to make predictions about whether a newly received API request 404 is likely associated with potential harmful activity.

The machine learning model 400 may receive as input, information associated with a newly received API request 404, and may output a tag or a prediction indicating whether the received API request is likely associated with potential harmful activity. For instance, to determine whether a new API request 404 is likely associated with potential harmful activity, the quarantine decisioning module 164 may input, into the machine learning model 400, information extracted from the message comprising the newly received API request 404 and/or from the newly received API request 404 itself. The data may include a record for each API request. The machine learning model 400 may receive the information associated with the API request and may output 406 a prediction of whether the API request is associated with potential harmful activity and a probability or a confidence score associated with the prediction. The probability or confidence score may indicate a probability of accuracy of the prediction or a degree of confidence in the prediction. The probability or the confidence score may be represented as a percentage or a numeric value, such as among a range of values, e.g., 1%-100%, 1-10, or the like; or may be an indication such as high, medium, low, etc. The probability or confidence score, however, are not limited to such representations and may be represented in a different way. The output 406 may be passed to the gateway device 140, and the gateway device 140 may make a determination regarding whether the API request is likely associated with potential harmful activity based on whether the prediction and/or the probability/confidence score satisfies a threshold.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method comprising:

receiving, by a first computing device and from a second computing device, a first Application Programming Interface (API) request that complies with a first API for a first application;

determining, based on data elements extracted from the first API comprising an API request count, whether the first API request is associated with a harmful activity;

identifying, based on determining that the first API request is associated with the harmful activity, a plurality of decoy APIs for a decoy application configured to use decoy information to emulate the first application, wherein a requested API by the first API request maps to the plurality of decoy APIs corresponding to a plurality of quarantine functions;

determining, based on an API method indicating a type of action to be performed and an amount of data to be accessed, a level of risk associated with the harmful activity;

after determining the level of risk associated with the harmful activity:

based on a determination that the level of risk is a first level of risk associated with the harmful activity, selecting, from the plurality of decoy APIs, a first decoy API associated with a first quarantine function; and based on a determination that the level of risk is a second level of risk, different from the first level of risk, associated with the harmful activity, selecting, from the plurality of decoy APIs, a second decoy API, different from the first decoy API, associated with a second quarantine function, wherein the first quarantine function is different from the second quarantine function;

modifying the first API request to invoke a decoy API selected from the first decoy API or the second decoy API, wherein the decoy API is associated with the determined one or more quarantining functions;

determining a response message output by the decoy API, wherein the response message is associated with the one or more quarantining functions that cause subsequent API requests received from the second computing device and via the first API to be quarantined; and sending, to the second computing device, the response message.

2. The method of claim 1, wherein the first API request comprises an access token identifying a client account, and wherein determining whether the first API request is associated with the harmful activity comprises:

determining that the first API request is associated with the harmful activity based on receiving information identifying one or more suspicious client accounts, wherein the one or more suspicious client accounts includes the client account.

3. The method of claim 1, wherein determining whether the first API request is associated with the harmful activity comprises:

providing, as input to one or more trained machine learning models, information associated with the first API request, wherein the information comprises an authentication token issued by an identity provider;

receiving, as output from the one or more trained machine learning models, an indication of a probability that the first API request is associated with the harmful activity; and based on the probability satisfying a threshold, determining that the first API request is associated with the harmful activity.

4. The method of claim 3, further comprising:

training, using training data comprising a history of harmful activity associated with a plurality of different client accounts, the one or more trained machine learning models to output an indication of a probability that a particular API request is associated with the harmful activity.

5. The method of claim 1, wherein the plurality of decoy APIs are executed in a sandbox environment separate from an environment in which the first API is executed.

6. The method of claim 1, wherein the one or more quarantining functions comprise one or more of:

a first function configured to generate the response message comprising instructions to redirect to a decoy page associated with a request for second authentication information; or a second function configured to generate the response message including fake data associated with the first API request.

7. The method of claim 1, wherein the response message output by the decoy API comprises instructions to redirect to a decoy page associated with a request for second authentication information, and wherein the method further comprises:

receiving one or more second API requests requesting access to the decoy page and the second authentication information; and storing information associated with the first API request and the one or more second API requests.

8. The method of claim 1, wherein the response message output by the decoy API is in accordance with a format specified by the first API.

9. The method of claim 1, further comprising blocking the first API from receiving the first API request.

10. The method of claim 1, wherein the data elements extracted from the first API request comprise an identification of an API called by the first API request, a time that the API is called by the first API request and the API request count associated with the API.

11. The method of claim 1, wherein the API method indicating the type of action to be performed comprises a data retrieval, a data creation, an update and a delete.

12. A first computing device comprising:

at least one processor; and memory storing instructions that, when executed by the at least one processor, cause the first computing device to:

receive, from a second computing device, a first Application Programming Interface (API) request that complies with a first API for a first application;

determine, based on data elements extracted from the first API request comprising an API request count, whether the first API request is associated with a harmful activity;

identify, based on determining that the first API request is associated with the harmful activity, a plurality of decoy APIs for a decoy application configured to use decoy information to emulate the first application, wherein a requested API by the first API request maps to the plurality of decoy APIs corresponding to a plurality of quarantine functions;

determine, based on an API method indicating a type of action to be performed and an amount of data to be accessed, a level of risk associated with the harmful activity;

after determining the level of risk associated with the harmful activity:

based on a determination that the level of risk is a first level of risk associated with the harmful activity, selecting, from the plurality of decoy APIs, a first decoy API associated with a first quarantine function; and based on a determination that the level of risk is a second level of risk, different from the first level of risk, associated with the harmful activity, selecting, from the plurality of decoy APIs, a second decoy API, different from the first decoy API, associated with a second quarantine function, wherein the first quarantine function is different from the second quarantine function;

modify the first API request to invoke a decoy API selected from the first decoy API or the second decoy API, wherein the decoy API is associated with the determined one or more quarantining functions;

determine a response message output by the decoy API, wherein the response message is associated with the one or more quarantining functions that cause subsequent API requests received from the second computing device and via the first API to be quarantined; and send, to the second computing device, the response message.

13. The first computing device of claim 12, wherein the first API request comprises an access token identifying a client account, and wherein the instructions, when executed by the at least one processor, cause the first computing device to determine whether the first API request is associated with the harmful activity by causing the first computing device to:

determine that the first API request is associated with the harmful activity based on receiving information identifying one or more suspicious client accounts, wherein the one or more suspicious client accounts includes the client account.

14. The first computing device of claim 12, wherein the instructions, when executed by the at least one processor, cause the first computing device to determine whether the first API request is associated with the harmful activity by causing the first computing device to:

provide, as input to one or more trained machine learning models, information associated with the first API request, wherein the information comprises an authentication token issued by an identity provider;

receive, as output from the one or more trained machine learning models, an indication of a probability that the first API request is associated with the harmful activity; and based on the probability satisfying a threshold, determine that the first API request is associated with the harmful activity.

15. The first computing device of claim 12,
wherein the plurality of decoy APIs are executed in a sandbox environment separate from an environment in which the first API is executed.

16. The first computing device of claim 12, wherein the one or more quarantining functions comprise one or more of:

a first function configured to generate the response message comprising a command to redirect to a decoy page associated with a request for second authentication information; or a second function configured to generate the response message including fake data associated with the first API request.

17. A non-transitory, computer-readable medium storing instructions that, when executed by a first computing device, cause:

receiving, from a second computing device, a first Application Programming Interface (API) request that complies with a first API for a first application;

determining based on data elements extracted from the first API request comprising an API request count, whether the first API request is associated with a harmful activity;

identifying, based on determining that the first API request is associated with the harmful activity, a plurality of decoy APIs for a decoy application configured to use decoy information to emulate the first application, wherein a requested API by the first API request maps to the plurality of decoy APIs corresponding to a plurality of quarantine functions;

determining, based on an API method indicating a type of action to be performed and an amount of data to be accessed, a level of risk associated with the harmful activity;

after determining the level of risk associated with the harmful activity:

based on a determination that the level of risk is a first level of risk associated with the harmful activity, select, from the plurality of decoy APIs, a first decoy API associated with a first quarantine function; and based on a determination that the level of risk is a second level of risk, different from the first level of risk, associated with the harmful activity, select, from the plurality of decoy APIs, second decoy API, different from the first decoy API, associated with a second quarantine function, wherein the first quarantine function is different from the second quarantine function;

modifying the first API request to invoke a decoy API selected from the first decoy API or the second decoy API, wherein the decoy API is associated with the determined one or more quarantining functions;

determining a response message output by the decoy API, wherein the response message is associated with the one or more quarantining functions that cause subsequent API requests received from the second computing device and via the first API to be quarantined; and sending, to the second computing device, the response message.

18. The non-transitory, computer-readable medium of claim 17, wherein the first API request comprises an access token identifying a client account, and wherein the instructions, when executed by the first computing device, cause determining that the first API request is associated with the harmful activity by:

determining that the first API request is associated with the harmful activity based on receiving information identifying one or more suspicious client accounts, wherein the one or more suspicious client accounts includes the client account.

19. The non-transitory, computer-readable medium of claim 17, wherein the instructions, when executed by the first computing device, cause determining whether the first API request is associated with the harmful activity by:

providing, as input to one or more trained machine learning models, information associated with the first API request, wherein the information comprises an authentication token issued by an identity provider;

receiving, as output from the one or more trained machine learning models, an indication of a probability that the first API request is associated with the harmful activity; and based on the probability satisfying a threshold, determining that the first API request is associated with the harmful activity.

20. The non-transitory, computer-readable medium of claim 17, wherein the plurality of decoy APIs are executed in a sandbox environment separate from an environment in which the first API is executed.

\* \* \* \* \*